(12) United States Patent
Nandlinger et al.

(10) Patent No.: US 11,762,794 B2
(45) Date of Patent: Sep. 19, 2023

(54) PROCESSING SYSTEM, RELATED INTEGRATED CIRCUIT, DEVICE AND METHOD

(71) Applicant: STMicroelectronics Application GMBH, Aschheim-Dornach (DE)

(72) Inventors: Rolf Nandlinger, Herrsching (DE); Roberto Colombo, Munich (DE)

(73) Assignee: STMicroelectronics Application GMBH, Aschheim-Dornach (DE)

( * ) Notice: Subject to any disclaimer, the term of this patent is extended or adjusted under 35 U.S.C. 154(b) by 0 days.

(21) Appl. No.: 17/747,800

(22) Filed: May 18, 2022

(65) Prior Publication Data

US 2022/0382695 A1 Dec. 1, 2022

(30) Foreign Application Priority Data

May 26, 2021 (IT) .................. 102021000013727

(51) Int. Cl.
*G06F 13/28* (2006.01)
*G06F 9/30* (2018.01)
(Continued)

(52) U.S. Cl.
CPC .......... *G06F 13/28* (2013.01); *G06F 9/30105* (2013.01); *G06F 9/3877* (2013.01);
(Continued)

(58) Field of Classification Search
CPC ..................................................... G06F 13/28
(Continued)

(56) References Cited

U.S. PATENT DOCUMENTS 5,751,955 A * 5/1998 Sonnier ............... G06F 11/1645
712/43
5,978,838 A * 11/1999 Mohamed ............. G06F 9/3879
712/E9.067

(Continued)

OTHER PUBLICATIONS

Dees, R. et al., "Introduction to the Zipwire Interface Inter-Processor Communication with SIPI/LFAST on the MPC57xx and S32Vxxx families," Freescale Semiconductor, Application Note, AN5134, May 2015, 38 pages.

*Primary Examiner* — Titus Wong
(74) *Attorney, Agent, or Firm* — Slater Matsil, LLP

(57) ABSTRACT

In an embodiment, a processing system comprises a microprocessor programmable via software instructions, a memory controller configured to be coupled to a memory, a communication system coupling the microprocessors to the memory controller, a cryptographic co-processor and a first communication interface. The processing system also comprises first and second configurable DMA channels. In a first configuration, the first DMA channel is configured to transfer data from the memory to the cryptographic co-processor, and the second DMA channel is configured to transfer the encrypted data via two loops from the cryptographic co-processor to the first communication interface. In a second configuration, the second DMA channel is configured to transfer received data via two loops from the first communication interface to the cryptographic co-processor, and the first DMA channel is configured to transfer the decrypted data from the cryptographic co-processor to the memory.

26 Claims, 11 Drawing Sheets

(51) Int. Cl.
  *G06F 9/38* (2018.01)
  *G06F 13/42* (2006.01)
  *G06F 21/60* (2013.01)
  *G06F 21/72* (2013.01)

(52) U.S. Cl.
  CPC ........ *G06F 13/4282* (2013.01); *G06F 21/602* (2013.01); *G06F 21/72* (2013.01)

(58) Field of Classification Search
  USPC .......................................................... 710/22
  See application file for complete search history.

(56) References Cited

U.S. PATENT DOCUMENTS

| | | | |
|---|---|---|---|
| 6,081,895 A * | 6/2000 | Harrison | G06F 21/85 380/37 |
| 6,192,491 B1 * | 2/2001 | Cashman | G06F 9/3004 714/52 |
| 6,704,871 B1 * | 3/2004 | Kaplan | G06F 21/74 713/192 |
| 7,716,389 B1 | 5/2010 | Bruce et al. | |
| 2003/0084309 A1 * | 5/2003 | Kohn | G06F 12/0811 712/E9.067 |
| 2004/0030816 A1 * | 2/2004 | Knight | G06F 13/28 710/52 |
| 2004/0268117 A1 * | 12/2004 | Olivier | H04N 7/1675 348/E7.056 |
| 2009/0113218 A1 * | 4/2009 | Dolgunov | G06F 13/28 713/190 |
| 2012/0036289 A1 * | 2/2012 | Go | G06F 13/28 710/23 |
| 2012/0233360 A1 * | 9/2012 | Go | G06F 13/28 710/23 |
| 2014/0040512 A1 | 2/2014 | Fernald | |
| 2015/0006765 A1 * | 1/2015 | Litch | G06F 13/28 710/22 |
| 2015/0121086 A1 * | 4/2015 | Smith | G06F 21/556 713/189 |

\* cited by examiner

PROCESSING SYSTEM, RELATED INTEGRATED CIRCUIT, DEVICE AND METHOD

CROSS-REFERENCE TO RELATED APPLICATIONS

This application claims the priority benefit of Italian patent application number 102021000013727, filed on May 26, 2021, entitled "Processing System, Related Integrated Circuit, Device and Method," which is hereby incorporated by reference.

TECHNICAL FIELD

The present disclosure relates generally to an electronic system and method, and, in particular embodiments, to a processing system, related integrated circuit, device and method.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Antilock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, such as a micro-controller, which may be used as any of the processing systems 10 of FIG. 1.

In the example considered, the processing system 10 comprises a microprocessor 102, usually the Central Processing Unit (CPU), programmed via software instructions. Usually, the software executed by the microprocessor 102 is stored in a non-volatile program memory 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has associated also a volatile memory 104b, such as a Random-Access-Memory (RAM). For example, the memory 104b may be used to store temporary data.

As shown in FIG. 2, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of:

one or more communication interfaces IF, e.g., for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or one or more analog-to-digital converters AD and/or digital-to-analog converters DA; and/or one or more dedicated digital components DC, such as hardware timers and/or counters, or a cryptographic co-processor; and/or one or more analog components AC, such as comparators, sensors, such as a temperature sensor, etc.; and/or one or more mixed signal components MSC, such as a PWM (Pulse-Width Modulation) driver.

Generally, dedicated digital components DC may also correspond to a FPGA integrated in the processing system 10. For example, in this case, the memory 104 may also comprise the program data for such a FPGA.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

In this respect, future generation of such processing systems 10, e.g., micro-controllers adapted to be used in automotive applications, are expected to exhibit an increase in complexity, mainly due to the increasing number of requested functionalities (new protocols, new features, etc.) and to the tight constraints of execution conditions (e.g., lower power consumption, increased calculation power and speed, etc.).

For example, recently more complex multi-core processing systems 10 have been proposed. For example, such multi-core processing systems may be used to execute (in parallel) several of the processing systems 10 shown in FIG. 1, such as several ECUs of a vehicle.

FIG. 3 shows an example of a multi-core processing system 10. Specifically, in the example considered, the processing system 10 comprises a plurality of n processing cores $102_1 \ldots 102_n$ connected to a (on-chip) communication system 114. For example, in the context of real-time control systems, the processing cores $102_1 \ldots 102_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core $102_1$, each processing core 102 may comprise a microprocessor 1020 and a communication interface 1022 configured to manage the communication between the microprocessor 1020 and the communication system 114. Typically, the interface 1022 is a master interface configured to forward a given (read or write) request from the microprocessor 1020 to the communication system 114, and forward an optional response from the communication system 114 to the microprocessor 102₀. However, the processing core 102 may also comprise a slave interface 1024. For example, in this way, a first microprocessor 102₀ may send a request to a second microprocessor 102₀ (via the communication interface 1022 of the first microprocessor, the communication system 114 and the communication interface 1024 of the second microprocessor).

Generally, each processing core 102₁ ... 102ₙ may also comprise further local resources, such as one or more local memories 1026, usually identified as Tightly Coupled Memory (TCM).

As mentioned before, typically the processing cores 102₁ ... 102ₙ are arranged to exchange data with a non-volatile memory 104 and/or a volatile memory 104b. In a multi-core processing system 10, often these memories are system memories, i.e., shared for the processing cores 102₁ ... 102ₙ. As mentioned before, each processing cores 102₁ ... 102ₙ may, however, comprise one or more additional local memories 1026.

For example, as shown in FIG. 3, the processing system 10 may comprise one or more memory controllers 100 configured to connect at least one non-volatile memory 104 and at least one volatile memory 104b to the communication system 114. As mentioned before, one or more of the memories 104 and/or 104b may be integrated in the integrated circuit of the processing system 10 or connected externally to the integrated circuit. For example, the processing system 10 may comprise:

a first volatile memory 104b integrated in the integrated circuit of the processing system 10 and connected to the communication system 114 via a first memory controller 100; and a second volatile memory 104b external with respect to the integrated circuit of the processing system 10 and connected to the communication system 114 via a second memory controller 100.

As mentioned before, the processing system 10 may comprise one or more resources 106, such as one or more communication interfaces or co-processors (e.g., a cryptographic co-processor). The resources 106 are usually connected to the communication system 114 via a respective slave communication interface 1064. For example, in this way, a processing core 102 may send a request to a resource 106 and the resource returns given data. Generally, one or more of the resources 106 may also comprise a respective master interface 1062. For example, such a master interface 1062 may be useful in case the resource has to start a communication in order to exchange data via (read and/or write) request with another circuit connected to the communication system 114, such as a resource 106 or a processing core 102. For example, for this purpose, the communication system 114 may indeed comprise an Advanced Microcontroller Bus Architecture (AMBA) High-performance Bus (AHB), and an Advanced Peripheral Bus (APB) used to connect the resources/peripherals 106 to the AMBA AHB bus.

Often such processing systems 10 comprise also one or more Direct-Memory-Access (DMA) controllers 110. Specifically, a DMA controller 110 comprises at least one functional channel connected to a resource 106. Often the resource 106 associated with a given channel may also be selected as a function of configuration data. Specifically, a DMA channel is configured to transfer data from a source address to a target address. For example, in this way, a communication interface IF may be connected to the DMA controller 110 via two channels:

a first channel configured to autonomously transfer data from a source address (e.g., associated with a first memory range in the memory 104b) to the communication interface IF; and a second channel configured to transfer data from the communication interface IF to a target address (e.g., associated with a second memory range in the memory 104b).

Accordingly, a DMA controller 110 typically has associate:

a slave interface 1104 for receiving configuration data for configuring the channels of the DMA controller 110, such as the address ranges associated with each channel, from the communication system1 114; and a master interface 1102 for transmitting the read or write requests via the communication system 114 to the memory controller 100.

Generally, instead of transmitting the read or write requests indirectly (via the communication system 114) to the memory controller 110, the DMA controller 110 may also be connected directly to a DMA interface of the memory controller 110.

For example, FIG. 4 shows a typical scenario wherein DMA channels are used to transmit data via a communication interface IF, indicated in FIG. 4 with the reference sign 50. For example, as will be described in the following, the present application relates specifically to the case, where the communication interface 50 is a Serial Inter-Processor Interface (SIPI).

Specifically, in the example considered, the data to be transmitted TD are stored to a given memory range in a volatile memory 104b of the processing systems 10.

Accordingly, once the transmission of data has been requested, e.g., because a processing core 102 sends a respective transmission request via the communication system 114 to a respective slave interface of the interface 50 (not shown in FIG. 4, but reference can be made to the description of the slave interface 1064 of FIG. 3), a control circuit 506 of the communication interface 50 may generate a request signal $REQ_1$, which is provided to a first DMA channel 110₁. Specifically, the respective DMA controller 110 is configured to transfer, in response to the request signal $REQ_1$, one or more bytes from a source address to a target address. Accordingly, the DMA channel 110₁ may be used to read the data TD, which are provided to one or more register 502 of the communication interface 50. For example, the registers 502 may comprise one or more data registers for storing the data bytes to be transmitted.

The data stored to the one or more register 502 are then provided to a hardware communication interface 504 of the communication interface 50 in order to transmit the data TD via one or more terminals IO, such as pads of a respective integrated circuit die, or pins of a respective packaged integrated circuit. For example, the hardware communication interface 504 may be a SIPI interface circuit configured to generate SIPI frames, which are then transmitted via a physical interface, in particular a Fast Asynchronous Serial Transmission (LFAST) interface comprising:

a differential transmitter configured to transmit a bit of a LFAST frame via two differential data lines SIPI_TXP and SIPI_TXN; and a differential receiver configured to receive a bit of the LFAST frame via two differential data lines SIPI_RXP and SIPI_RXN.

Those of skill in the art will appreciate that a LFAST transceiver may operate with a low-speed operating frequency (typically 5 MHz) and a high-speed operating frequency (typically 320 MHz). Moreover, the various transceivers are synchronized via a PLL (which usually supports a PLL multiplier of 32 or 16) of the transceivers which exchange a reference clock signal REFCLOCK (typically set to 10 MHz or 20 MHz).

Substantially, each SIPI frame comprises a SIPI header, a SIPI payload corresponding to the data to be transmitted and a SIPI CRC field, and is used for the transport and session layer. Conversely, the LFAST interface is used to exchange LFAST frames comprising a LFAST header, a LFAST payload corresponding to the SIPI frame and a stop bit. Accordingly, LFAST is used for the media layers (physical, data link and network layers). Such a SIPI-LFAST communication interface is often also called Zipwire.

Accordingly, in case of a SIPI communication interface, the processing core 102 may configure the SIPI communication interface 50, e.g., to use given SIPI header information.

For a general description of SIPI and LFAST, reference can be made, e.g., to document Randy Dees, et al, Application Note AN5134, Introduction to the Zipwire Interface, Inter-Processor Communication with SIPI/LFAST on the MPC57xx and S32Vxxx families, Freescale Semiconductor, Rev. O, May 2015, which is incorporated herein by reference for this purpose.

For security reasons it is often preferably to transmit encrypted data ED. For example, this applies also to automotive applications, especially after it has been demonstrated how a hacker can take over the control of a car from remote. Accordingly, in this case, the processing system 10 may comprise a cryptographic co-processor 40, such as an AES (Advanced Encryption Standard) co-processor.

Accordingly, a processing core 102 may store the original/unencrypted data OD to a given memory range in a volatile memory 104b of the processing systems 10. Moreover, the processing core 102 may send a command ENCCMD to the cryptographic co-processor 40, which, e.g., specifies the number of bytes of data OD to be encrypted. Moreover, the command ENCCMD may also specify the configuration to be used to encrypt the data OD. For example, in case of an AES communication interface, the command ENCCMD could indicate the type of operation to be used, such as Electronic codebook (ECB) or Cipher Block Chaining (CBC).

Accordingly, once the encryption of data has been requested, a control circuit 406 of the co-processor 40 may generate a request signal $REQ_2$, which is provided to a second DMA channel $110_2$. Accordingly, the DMA channel $110_2$ may be used to read the data OD, which are provided to one or more register 402 of the co-processor 40. For example, the registers 402 may comprise one or more data registers for storing the data bytes to be encrypted. The data stored to the one or more register 502 are then provided to a hardware encryption processor 404 of the co-processor 40 in order to encrypt the data OD. Accordingly, in this case the DMA channel $110_2$ should be configured to transfer one or more bytes of data OD to be encrypted from the memory 104b to the data register(s) of the co-processor 40.

Specifically, the encrypted data ED generated by the hardware encryption processor 404 are stored to one or more further registers 408 of the co-processor 40. Accordingly, once the encryption of data has been completed, the control circuit 406 of the co-processor 40 may generate a request signal $REQ_3$, which is provided to a DMA channel $110_3$. Specifically, the respective DMA controller 110 is configured, in response to the request signal $REQ_3$, to transfer the data from the register(s) 408 to the memory 104b.

Accordingly, by configuring the DMA channel $110_3$ in order to transfer the encrypted data ED to the memory range associated with the data to be transmitted TD, the communication interface 50 may directly transmit the encrypted data ED. Accordingly, in the example considered, the processing core 102 may:

configure the DMA channels $110_1$, $110_2$ and $110_3$;
send the request in order to start the data encryption operation;
wait until the encryption operation has been completed;
send the request in order to start the data transmission operation; and
wait until the data transmission operation has been completed.

SUMMARY

The solution shown in FIG. 4, permits to encrypt the data OD and transmit the encrypted data ED without a significant involvement of the processing core(s) 102. However, the interface 50 cannot transmit the encrypted data ED until all data have been encrypted. This raises problems in terms of latency and available bandwidth, in particular in case a significant amount of data has to be transmitted, e.g., by using the streaming mode of the SIPI protocol.

In view of the above, some embodiments provide solutions for encrypting data via an AES co-processor and transmitting the encrypted data via a SIPI communication interface.

Embodiments of the present disclosure relate to processing systems, such as microcontrollers, configured to encrypt data and transmit the encrypted data, and/or receive data and decrypt the received data.

Some embodiments relate to a processing system having the features specifically set forth in the claims that follow. Embodiments moreover concern a related integrated circuit, device and method.

The claims are an integral part of the technical teaching of the disclosure provided herein.

As mentioned before, various embodiments of the present disclosure relate to a processing system, e.g., integrated in an integrated circuit, such as a microcontroller.

In various embodiments, the processing system comprises a microprocessor programmable via software instructions, a memory controller configured to be connected to a memory and a communication system connecting the microprocessors to the memory controller. In various embodiments, the processing system comprises moreover a cryptographic co-processor, such as an AES co-processor, and a Serial Inter-Processor Interface (SIPI) communication interface.

Specifically, in various embodiments, the cryptographic co-processor comprises a plurality of input data registers configured to store a first block of data having 16 bytes, wherein the number of input data registers corresponds to a first number of registers, a plurality of output data registers configured to store a first block of processed data, wherein the number of output data registers corresponds to the first number of registers, and a control register programmable by the microprocessor and configured to store first configuration data. The cryptographic co-processor comprises also a cryptographic processing circuit configured to process (i.e., encrypt or decrypt) the data stored to the input data registers as a function of the first configuration data stored to the control register, and store respective processed data to the output data registers, wherein the cryptographic processing circuit is configured to generate a first control signal when the processed data have been stored to the output data registers.

In various embodiments, the cryptographic co-processor permits to use DMA transfers. Specifically, in this case, the cryptographic co-processor comprises a first and a second DMA interface circuit. Specifically, the first DMA interface circuit is configured to generate a first request signal requesting that a new first block of data should be transferred to the input data registers. Specifically, for this purpose, the first DMA interface circuit may assert the first request signal as a function of the first configuration data stored to the control register (used in particular for the first DMA request and/or to enable the DMA transfer) and in response to a synchronization signal provided by the second DMA interface circuit (used in particular for following DMA requests), and de-assert the first request signal in response to a first acknowledge signal. The second DMA interface circuit is configured to generate a second request signal requesting that a first block of processed data should be transferred from the output data registers. Specifically, for this purpose, the second DMA interface circuit may assert the second request signal as a function of the first control signal provided by the cryptographic processing circuit, and de-assert the second request signal in response to a second acknowledge signal. The second DMA interface circuit is also configured to assert the synchronization signal in response to the second acknowledge signal.

The SIPI communication interface may comprise a SIPI transmitter and/or a SIPI receiver.

In case of a SIPI transmitter, the SIPI communication interface comprises a plurality of transmission data registers configured to store a second block of data having 32 bytes, wherein the number of transmission data registers corresponds to a second number of registers, wherein the second number of registers corresponds to the double of the first number of registers, and a control register programmable by the microprocessor and configured to store second configuration data. Moreover, the SIPI communication interface comprises a hardware SIPI communication interface, in particular comprising at least a SIPI transmitter, configured to transmit the data stored to the transmission data registers as a function of the second configuration data stored to the control register, wherein the SIPI hardware communication interface is configured to generate a second control signal when the data stored to the transmission data registers have been transmitted.

In various embodiments, such a SIPI communication interface permits to use a DMA transfer for the data to be transmitted. Specifically, in this case, the SIPI communication interface comprises a DMA interface circuit configured to generate a third request signal requesting that a new second block of data should be transferred to the transmission data registers. For this purpose, the DMA interface circuit may assert the third request signal as a function of the second configuration data stored to the control register (used in particular for the first DMA request and/or to enable the DMA transfer) and in response to the second control signal (used in particular for following DMA requests), and de-assert the third request signal in response to a third acknowledge signal.

Conversely, in case of a SIPI receiver, the SIPI communication interface has associated a storage element having a plurality of slots configured to store a second block of data having 32 bytes. Specifically, in various embodiments, the number of slots corresponds to the double of the first number of registers. Specifically, as will be described in greater detail in the following, the storage element may be implemented with reception data registers of the SIPI communication interface or with a temporary buffer implemented with memory slots in the memory.

Moreover, the SIPI communication interface comprises a hardware SIPI communication interface, in particular comprising at least a SIPI receiver, configured to receive data and store the received data to the slots of the storage element, wherein the SIPI hardware communication interface is configured to generate a second control signal when the SIPI hardware communication interface has stored 32 bytes to the slots of the storage element.

In various embodiments, such a SIPI communication interface permits to use a DMA transfer for the received data. Specifically, in this case, the SIPI communication interface comprises a DMA interface circuit configured to generate a third request signal requesting that a second block of data should be transferred from the slots of the storage element. For this purpose, the DMA interface circuit may assert the third request signal in response to the second control signal, and de-assert the third request signal in response to a third acknowledge signal.

For example, in case the storage element is implemented with reception data registers, the SIPI hardware communication interface is configured to assert the second control signal when the SIPI hardware communication interface has stored 32 bytes to the reception data registers.

Alternatively, in case the storage element is implemented with memory slots in the memory, the SIPI hardware communication interface may comprise a plurality of reception data registers, wherein the SIPI hardware communication interface is configured to assert a third control signal when the SIPI hardware communication interface has stored 32 bytes to the reception data registers, and a further DMA channel configured to, in response to the third control signal, transfer the data from the reception data registers to the memory slots in the memory. Accordingly, once having transferred 32 bytes from the reception data registers to the memory slots in the memory, the further DMA channel may assert the second control signal.

In various embodiments, such a cryptographic co-processor and SIPI communication interface comprising a SIPI transmitter may be used to transmit encrypted data. Specifically, in this case, a first DMA channel may be configured to transfer data to the cryptographic co-processor, and a second DMA channel may be configured to transfer data from the cryptographic co-processor to the SIPI communication interface.

For example, the first DMA channel may be configured to, in response to the first request signal provided by the cryptographic co-processor, send requests to the memory controller in order to transfer a new first block of data from the memory to the input data registers of the cryptographic co-processor and, once having transferred the new first block of data from the memory to the input data registers, assert the first acknowledge signal.

The second DMA channel may be configured to receive an initial source address and an initial target address, wherein the initial source address corresponds to an address associated with a first register of the output data registers and the initial target address corresponds to an address associated with a first register of the transmission data registers. Next, the second DMA channel sets a source address to the initial source address and a target address to the initial target address, and executes two loops. During each loop, the second DMA channel executes, in response to a DMA request signal, a given number of data transfer operations from the source address to the target address, wherein the given number of data transfer operations corresponds to the first number of registers, and wherein the source address and the target address are increased for each data transfer operation. Moreover, once the given number of data transfer operations has been executed, the second DMA channel asserts the second acknowledge signal provided to the cryptographic co-processor and resets the source address to the initial source address. Once having executed the two loops, the second DMA channel asserts the third acknowledge signal provided to the SIPI communication interface and resets the target address to the initial target address.

In this case, the processing system comprises also a request control circuit configured to assert the DMA request signal of the second DMA channel in response to determining that the second request signal provided by the cryptographic co-processor and the third request signal provided by the SIPI communication interface are asserted, and de-assert the DMA request signal in response to determining that the second request signal or the third request signal are de-asserted.

In various embodiments, the SIPI communication interface comprising a SIPI receiver and the cryptographic co-processor may be used to receive data and decrypt the received data. Specifically, in this case, a first DMA channel may be configured to transfer data from the cryptographic co-processor to a memory, and a second DMA channel may be configured to transfer data from the SIPI communication interface to the cryptographic co-processor.

For example, the first DMA channel may be configured to, in response to the second request signal provided by the cryptographic co-processor, send requests to the memory controller in order to transfer a first block of data from the output data registers to the memory and, once having transferred the first block of data from the output data registers to the memory, assert the second acknowledge signal provided to the cryptographic co-processor.

The second DMA channel may be configured to receive an initial source address and an initial target address, wherein the initial source address corresponds to an address associated with a first slot of the storage element and the initial target address corresponds to an address associated with a first register of the input data registers of the cryptographic co-processor. For example, based on the implementation of the storage element, the initial source address may correspond to an address associated with a first register of the reception data registers, or an address associated with a first memory slot of the memory slots in the memory. Next, the second DMA channel sets a source address to the initial source address and a target address to the initial target address, and executes two loops. During each loop, the second DMA channel executes, in response to a DMA request signal, a given number of data transfer operations from the source address to the target address, wherein the given number of data transfer operations corresponds to the first number of registers, and wherein the source address and the target address are increased for each data transfer operation. Moreover, once the given number of data transfer operations has been executed, the second DMA channel asserts the first acknowledge signal provided to the cryptographic co-processor and resets the target address to the initial target address. Once having executed the two loops, the second DMA channel asserts the third acknowledge signal provided to the SIPI communication interface and resets the source address to the initial source address, Accordingly, also in this case, the processing system comprises a request control circuit configured to assert the DMA request signal provided to the second DMA channel in response to determining that the first request signal provided by the cryptographic co-processor and the third request signal provided by the SIPI communication interface are asserted, and de-asserts the DMA request signal in response to determining that the first request signal or the third request signal are de-asserted.

Thus, when implementing a transmission or reception chain, the processing system uses in both cases the second DMA channel, which is configured to execute two loops of the same number of data transfers, which permits to assert the respective acknowledge signals provided to the DMA interface circuits of the cryptographic co-processor and the SIPI communication interface. Moreover, in both cases, a request control circuit is used to synchronize the respective request signals provided by the DMA interface circuits of the cryptographic co-processor and the SIPI communication interface.

Accordingly, in various embodiments, the processing system may support both modes, i.e., the transmission mode and the reception mode, by reconfiguring the first and second DMA channels. For example, for this purpose, the first DMA channel and the second DMA channel may be implemented with general-purpose DMA controllers configured to transfer data by sending a read request to the respective source address, and sending a write request comprising data received in response to the read request to the respective target address.

In various embodiments, in case of a transmission chain, the cryptographic operation may be started in response to the first acknowledge signal provided by the first DMA channel. Conversely, in case of a reception chain, the cryptographic operation may be started in response to the second acknowledge signal provided by the second DMA channel.

Alternatively, the cryptographic operation may be started by writing a control command to the control register of the cryptographic co-processor. For example, for this purpose, the processing system may comprise a further DMA channel configured to, once a new fist block has been stored to the input data registers of the cryptographic co-processor, as signaled, e.g., via the acknowledge signal of the respective DMA channel used to transfer the respective block of data, transfer an encryption or decryption command from a fixed source address to an address associated with the first control register of the cryptographic co-processor.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following FIGS. 5 to 17 parts, elements or components which have already been described with reference to FIGS. 1 to 4 are denoted by the same references previously used in such Figure; the description of such previously described elements will not be repeated in the following in order not to overburden the present detailed description.

Figure 5:
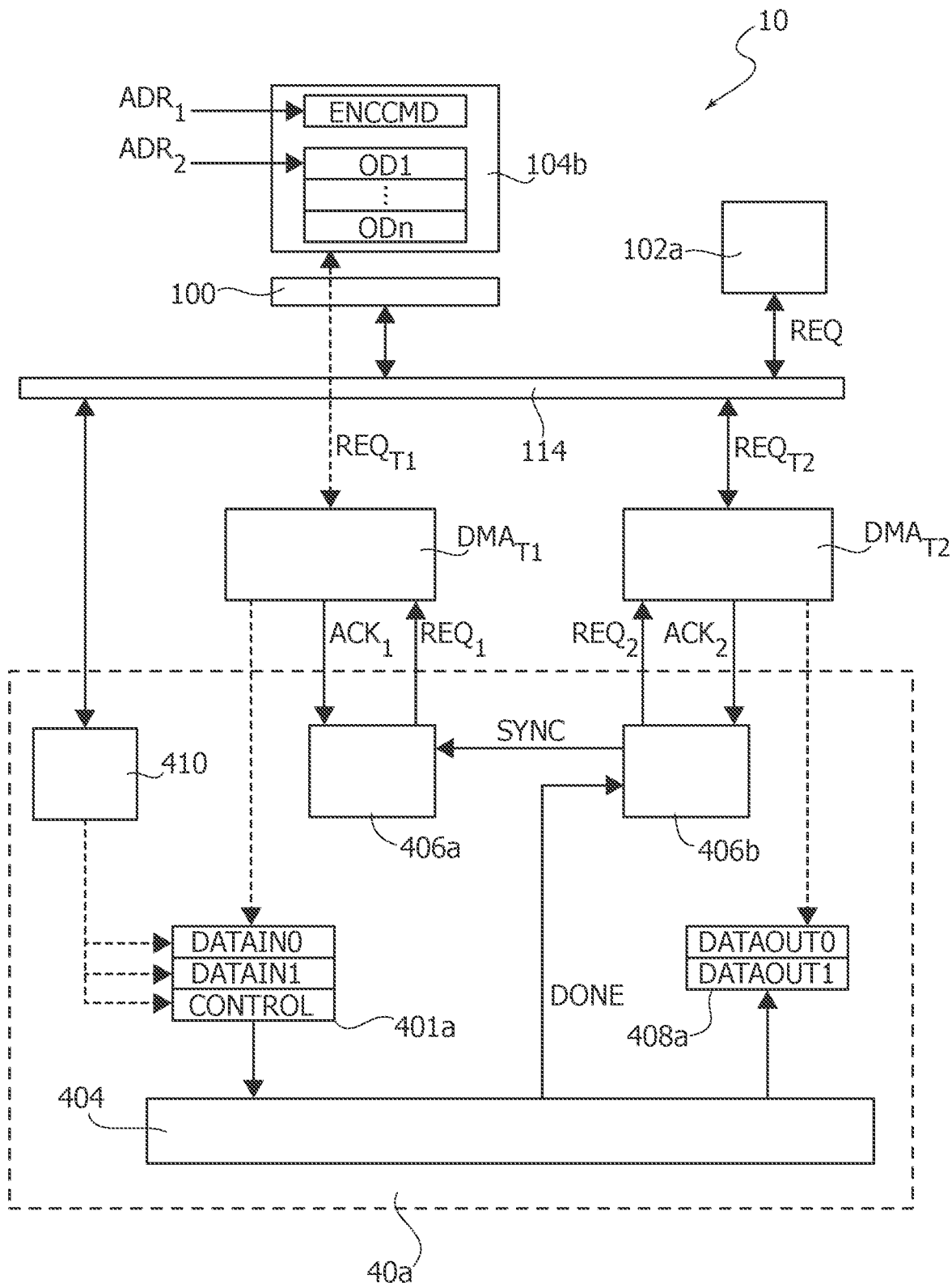
FIG. 5 shows an embodiment of a processing system comprising a cryptographic co-processor, such as an AES co-processor.

FIG. 5 shows an embodiment of a processing system 10a comprising a cryptographic co-processor 40a.

In the embodiment considered, the underlying architecture of the processing system 10a corresponds to the processing system described with respect to FIGS. 1 to 4, and the respective description applies in their entirety. Thus, also in this case, the processing system 10a, such as an integrated circuit, comprises:
- a communication system 114, such as a bus or NoC;
- at least one processing core 102a, wherein each processing core comprises at least one microprocessor 1020 and at least one communication interface 1022 configured to connect the microprocessor(s) 1020 to the communication system 114;
- at least one memory controller 100 configured to be connected to a (internal or external) non-volatile memory 104 and/or a volatile memory 104b;
- a cryptographic co-processor 40a;
- at least two DMA channels $DMA_{T1}$ and $DMA_{T2}$, which may belong to the same DMA controller 110 or two separate DMA controllers 110; and
- optional further circuits, such as one or more resources/peripherals 106.

Specifically, in the embodiment considered, the cryptographic co-processor 40a comprises a cryptographic processing circuit 404 configured to execute cryptographic operations based on a symmetric cryptography, in particular the AES cryptographic algorithm. Generally, the AES algorithm works on chunks of 16 bytes (128 bit) at a time, called AES block.

Accordingly, in the embodiment considered, the cryptographic processing circuit 404 has associated registers DATAIN for storing the data to be processed and registers DATAOUT for storing the processed data. For example, assuming a 64-bit processing system 10a, the cryptographic co-processor 40a may comprise:
- two input data registers DATAIN0 and DATAIN1, each having 8 bytes (64 bits), for storing the data to be processed; and
- two output data registers DATAOUT0 and DATAOUT1, each having 8 bytes (64 bits), for storing the processed data.

Typically, the number and dimension of the input and output data registers DATAIN and DATAOUT depend on the number w of bits transmitted via the communication system 114. Specifically, the dimension of the input and output data registers DATAIN and DATAOUT corresponds to the number w, and the number k of the registers may be calculated as 128/w. For example, in case of a 32-bit (i.e., w=32) system, four (i.e., k=128/w=4) registers DATAIN0, ... DATAIN3, with a size of 32 (i.e., w) bits would be used. Moreover, the same number of output data registers DATAOUT may be used, or the registers DATAIN may be used to store the data to be processed and the processed data, i.e., the output data registers DATAOUT may correspond to the registers DATAIN.

Moreover, the cryptographic processing circuit 404 has associated one or more control registers CONTROL for storing control data. For example, in various embodiments the (or each) control register has w bits, such as 64 bits.

For example, as schematically shown in FIG. 5, the cryptographic co-processor 40a may comprise a slave interface 410 connected to the communication system 114 and configured to interface the control register(s) CONTROL, the input data registers DATAIN and the output data registers DATAOUT with the communication system 114.

For example, in this way, a processing core 102 may send a sequence of requests REQ to the slave interface 410 in order to:
- write the content of the input data registers DATAIN and the content of the control register(s) CONTROL, and
- once the cryptographic operation has been executed, read the content of the output data registers DATAOUT.

Accordingly, in the embodiment considered, the cryptographic processing circuit 404 is configured to generate the data stored to the output data registers DATAOUT by performing a cryptographic operation on the data stored to the input data registers DATAIN as a function of the data stored to the control register(s) CONTROL.

For example, in various embodiments, the cryptographic co-processor 40 may be configured to use the AES Cipher Block Chaining (CBC) mode. In this case the data are encrypted (or decrypted) based on a combination of the outcome of the previous block merged with the new AES block. A secret key is involved during the data processing, so that the decryption of the data is possible only if the same secret/cipher key is used by the entity encrypting the data and the entity decrypting the data. The key sharing is usually done during the start-up of the processing system and the specific implementation as not of particular interest for the present disclosure. Accordingly, the data stored to the control register(s) specify the operation to be executed, such as an encryption or decryption operation, the AES mode to be used, optionally which secret key should be used, etc.

As shown in FIG. 5, in the embodiment considered, the cryptographic co-processor 40a comprises also two DMA interfaces 406a and 406b. Specifically, the first interface

406a is connected to a DMA channel $DMA_{T1}$ and generates a first request signal $REQ_1$ used to request new data to be processed. Conversely, the second interface 406b is connected to a DMA channel $DMA_{T2}$ and generates a second request signal $REQ_2$ used to request the reading of the processed data.

Generally, based on the implementation of the cryptographic processing circuit 404, a cryptographic operation may be started in various modes.

For example, in various embodiments, the processing core 102 is configured to first write a start command INIT to the control register CONTROL, whereby the control command indicates the parameters to be used for the cryptographic operation. The processing core 102 may then encrypt one or more blocks of data by writing the data to be encrypted to the input data registers DATAIN and optionally writing a new command ENCCMD to the control register CONTROL, wherein the command ENCCMD indicates that the parameters of a previously initialized cryptographic operation should be used.

Similarly, when using a DMA transfer, the control command INIT may enable the DMA transfer for the DMA interface 406a. Accordingly, in response to the command INIT, the DMA interface 406a asserts the first request signal $REQ_1$. Accordingly, in this case, the DMA channel $DMA_{T1}$ should be configured to read from a memory, such as the volatile memory 104b, for each cryptographic operation one AES block, i.e., 128 bits of data, to be stored to the input data registers DATAIN.

In various embodiments, the DMA channel $DMA_{T1}$ may thus also be configured to transfer a new command ENCCMD to the control register CONTROL, i.e., transfer w bits of data to the control register CONTROL, thereby starting the processing operation for the AES block. For example, in case w=64 bits, the DMA channel $DMA_{T1}$ may be configured to transfer 24 bytes from the memory controller 100 associated with the memory 104b to the registers DATAIN and CONTROL.

Generally, a DMA controller may be a general-purpose DMA controller, or an integrated DMA controller integrated in a circuit of the processing system 10a, such as a memory controller 100, the cryptographic co-processor 40 or a communication interface IF. Generally, such DMA controllers have in common that each data transfer is identified by a given source address and a given target address.

Specifically, in case of a general-purpose DMA controller, the DMA controller is configured to:
start a read transfer comprising the source address;
once having received the respective data with the response to the read request, start a write transfer comprising the target address and the received data.

Thus, in this case, two communications are performed via the communication system 114. For example, in order to implement the DMA channel $DMA_{T1}$, the source address may point to the memory 104b and the target address may point to one of the registers DATAIN or CONTROL.

Conversely, in case of an integrated DMA channel, one of the communications via the communication system 114 may be omitted. For example, the DMA channel $DMA_{T1}$ may be an integrated DMA channel of the memory controller 100 or the co-processor 40a. In the former case, the DMA channel $DMA_{T1}$ manages as source addresses only the address range handled by the memory controller 100 and is configured to read the data directly from the source address of the memory 104b and send a write request comprising the target address associated with one of the registers DATAIN or CONTROL and the read data to the communication system 114, which are thus received by the slave interface 410 of the co-processor 40a and stored to the one of the registers DATAIN or CONTROL. Conversely, in the latter case, the DMA channel $DMA_{T1}$ manages as target addresses only addresses associated with the registers DATAIN or CONTROL and is configured to send a read request comprising as source address a memory address of the memory 104b, and to store the received data directly to one of the registers DATAIN or CONTROL. Accordingly, in case of an integrated DMA controller, a single communication is performed via the communication system 114. Generally, instead of sending the write or read requests via the communication system 114, also a dedicated DMA communication interface of the memory controller 100 could be used.

For example, independently of the specific implementation of the DMA channel $DMA_{T1}$, in order to correctly map the data in the memory 104b to the registers DATAIN and CONTROL, the data stored to the memory 104b may comprise always a sequence of three packets comprising two packets of original data to be stored to the registers DATAIN0 and DATAIN1 and one packet for the control data to be stored to the register CONTROL.

Alternatively, as shown in FIG. 5, the control data ENCCMD to be transferred to the control register(s) CONTROL may be stored to a first memory location at a first address $ADR_1$ and the data to be processed OD, such as packets OD1, . . . ODn, may be stored to n memory locations starting at a second address $ADR_2$. Accordingly, in this case, the DMA channel $DMA_{T1}$ may be configured to perform the following operations for each AES processing cycle:
transfer k data words from the memory 104b to the input data registers DATAIN, wherein the source address corresponds to the $ADR_2$, which is increased for each data transfer, and wherein the target address points sequentially to one of the input data registers DATAIN; and
transfer the command ENCCMD from the fixed address $ADR_1$ to the target address associated with the register CONTROL.

For example, the above configuration of the DMA channel $DMA_{T1}$ may be implemented with a particular configuration of a (e.g., general-purpose) DMA controller included in various micro-controllers sold by the present applicant.

Figure 6:
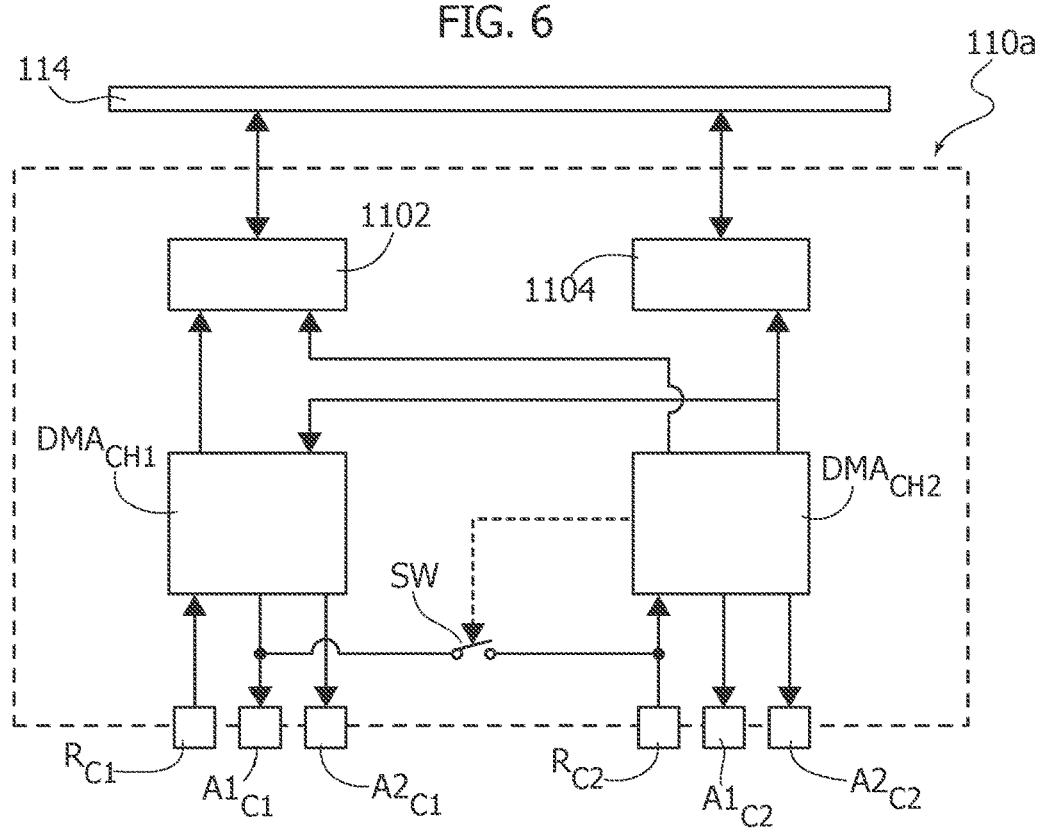
FIGS. 6 and 7 show an embodiment of a DMA controller.

FIG. 6 shows in this respect an embodiment of a DMA controller 110a.

Specifically, in the embodiment considered, the DMA controller 110a comprise at least two DMA channels $DMA_{CH1}$ and $DMA_{CH1}$. For example, in the embodiment considered, the DMA controller 110a comprises a slave interface 1104 connected to the communication system 114 for configuring the DMA channels $DMA_{CH1}$ and $DMA_{CH1}$. For example, each of the DMA channels may have associated respective configuration registers. For example, as other programmable registers, each configuration register may have associated a respective physical address (within the address range managed by the communication system 114), whereby the configuration registers may be programmed, e.g., via software instructions, by sending write requests comprising the respective address of a configuration register to the communication system 114. For example, each DMA channel may be:
an integrated DMA write channel, wherein the DMA channel is connected directly to at least one register of an associated circuit and is configured to send the content of a register (essentially identified via a source address) via a write request (comprising a target address) either to the communication system 114 or directly the memory controller 100;

an integrated DMA read channel, wherein the DMA channel is connected directly to at least one register of an associated circuit and is configured to send a read request (comprising a source address) either to the communication system 114 or directly the memory controller 100, and store the respective received data to a register (essentially identified via a target address); or a general-purpose DMA channel, wherein the DMA channel is configured to send a read request (comprising a source address) to the communication system 114, temporarily store the respective received data, and send the temporarily stored data via a write request (comprising a target address) to the communication system 114.

Figure 7:
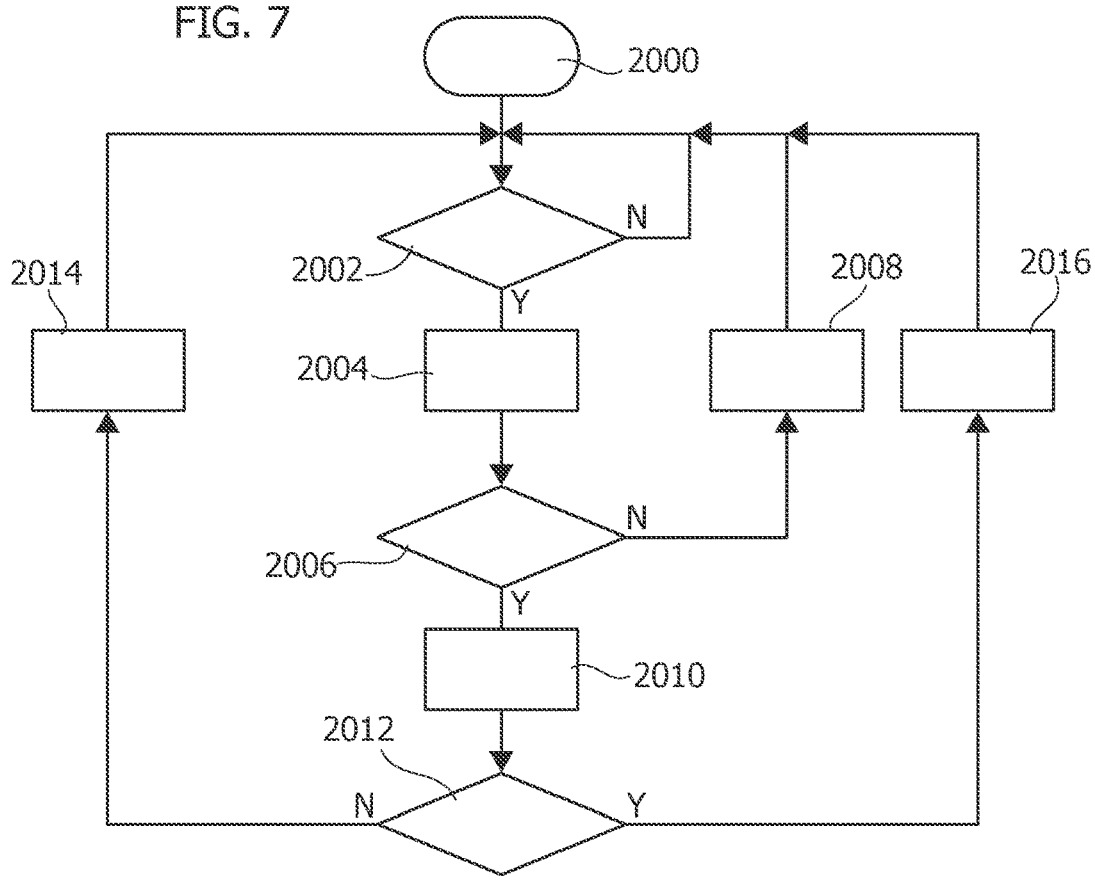

Specifically, as shown in FIG. 7, in various embodiment, each DMA channel is configured to implement two loops: a minor loop and a major loop. For example, for this purpose the DMA channel may be implemented with a control circuit having associated the above-mentioned configuration registers configured to stored channel configuration data, which are programmable via the slave interface 1104.

Specifically, after a start step 2000, the DMA channel may verify at a step 2002 whether a request signal R is asserted, such as a request signal $R_{C1}$ for the channel $DMA_{CH1}$ or a request signal $R_{C2}$ for the channel $DMA_{CH2}$. Generally, the DMA channel may verify also further conditions at the step 2002, such as whether the DMA channel is enabled as indicated by the channel configuration data stored to the configuration registers.

In case the request signal R is de-asserted (output "N" of the verification step 2002), the DMA channel returns to the step 2002. Conversely, in case the request signal R is asserted (output "Y" of the verification step 2002), the DMA channel executes at a step 2004 the data transfer operation between the source address and the target address, e.g., by executing a read or write request, or first a read request and then a write request. For example, the initial source address and the initial target address may be stored to the channel configuration data.

In the embodiment considered, the DMA channel verifies then at a step 2006 whether a given number of requested transfers have been executed. For example, the number of requested transfers may be stored to the configuration registers.

In case the number of transfers is smaller than the number of requested transfers (output "N" of the verification step 2006), the DMA channel proceeds to a step 2008 where the DMA channel, e.g., increases a first counter identifying the number of transfers. However, the DMA channel may also perform one or more further operations, which are programmable as a function of the channel configuration data, such as increasing the source address and/or the target address. Next, the DMA channel returns to the step 2002, in order to execute the next data transfer in response to the request signal R.

Conversely, in case the number of transfers reaches the number of requested transfers (output "Y" of the verification step 2006), the DMA channel sets at a step 2010 a first acknowledge signal A1, such as an acknowledge signal $A1_{C1}$ for the channel $DMA_{CH1}$ or an acknowledge signal $A1_{C2}$ for the channel $DMA_{CH2}$, and resets the first counter. Accordingly, the first acknowledge signal indicates the completion of the first loop of requested transfers, indicated in the following as minor loop.

In the embodiment considered, the DMA channel verifies then at a step 2012 whether a given number of requested loops have been executed. For example, the number of requested loops may be stored to the configuration registers.

In case the number of loops is smaller than the number of requested loops (output "N" of the verification step 2012), the DMA channel proceeds to a step 2014 where the DMA channel, e.g., increases a second counter identifying the number of loops. However, the DMA channel may also perform one or more further operations, which are programmable as a function of the data stored to the configuration registers, such as a reset of the source address and/or the target address to the respective initial value. Next, the DMA channel returns to the step 2002, in order to execute the next data transfer in response to the request signal R.

Conversely, in case the number of loops reaches the number of requested loops (output "Y" of the verification step 2012), the DMA channel sets at a step 2016 a second acknowledge signal A2, such as an acknowledge signal $A2_{C1}$ for the channel $DMA_{CH1}$ or an acknowledge signal $A2_{C2}$ for the channel $DMA_{CH2}$, and resets the second counter. Accordingly, the second acknowledge signal A2 indicates the completion of the second loop of requested minor loops, indicated in the following as major loop. Generally, the DMA channel may also perform one or more further operations at the step 2016, which are programmable as a function of the channel configuration data, such as resetting the source address and/or the target address to the respective initial value. Next, the DMA channel returns to the step 2002, in order to execute the next data transfer in response to the request signal R.

In various embodiments, the request signal $R_{C2}$ of the second DMA channel $DMA_{CH2}$ may correspond to the first (minor loop) acknowledge signal $A1_{C1}$ or the second (major loop) acknowledge signal $A2_{C1}$ of the first DMA channel $DMA_{CH1}$. Preferably, this configuration is programmable as schematically shown via an electronic switch SW connecting the request signal $R_{C2}$ to the acknowledge signal $A2_{C1}$.

For example, such a DMA controller may be used to implement the operation of the DMA channel $DMA_{T1}$ with the DMA channels $DMA_{CH1}$ and $DMA_{CH2}$. Specifically, the first DMA channel $DMA_{CH1}$ may be configured to transfer via the minor loop (2002, 2004, 2006, 2008) k data packets (i.e., the number of input data registers DATAIN) from a source address to a target address. In this case, the source address is initialized to the address $ADR_2$ and increased at the step 2008, i.e., for each data transfer. Conversely, the target address is initialized to the address associated with the first input data register DATAIN0 and the target address is increased at the step 2008, but then reset to the initial value at the step 2014, whereby each inner loop starts from the address associated with the first input data register DATAIN0 and is then increased during the inner loop. Moreover, once the data transfer of the k data packets has been completed, the first DMA channel generates at the step 2010 the acknowledge signal $A1_{C1}$, which is provided as request signal $R_{C2}$ to the DMA channel $DMA_{CH2}$. Accordingly, in response to the acknowledge signal $A1_{C1}$, the DMA channel $DMA_{CH2}$ may be configured to transfer a single data packet from a source address to a target address, wherein the source address is set to the address $ADR_1$ and the target address is set to the address associated with the control register CONTROL. For example, as mentioned before, in various embodiments, a new cryptographic operation may be started by writing the content of the control register CONTROL. Accordingly, in the embodiment considered, the minor loop transfers the data for a single cryptographic operation, and the number of requested loops (implemented with the major loop) indicates the total number of cryptographic operations to be executed by the co-processor 40a.

For example, in this case, the signal $REQ_1$ generated by the DMA interface circuit 406a may be connected to the request signal $R_{C1}$ and optionally the (inner loop) acknowledge signal $A1_{C2}$ of the DMA channel $DMA_{CH2}$ may be provides as an acknowledge signal $ACK_1$ to the DMA interface 406a. In this case, the cryptographic operation could also be started in response to the acknowledge signal $ACK_1$.

Conversely, in case the transfer of the control command ENCCMD is not required, only the channel $DMA_{CH1}$ could be used, wherein the acknowledge signal $A1_{C1}$ of the DMA channel $DMA_{CH1}$ may be provides as acknowledge signal $ACK_1$ to the DMA interface 406a, which may be used to start the cryptographic operation.

Accordingly, once the cryptographic processing circuit 404 has completed the processing of the data stored to the input data registers DATAIN, the data stored to the output data registers DATAOUT may be read. For example, for this purpose the cryptographic processing circuit 404 may generate a signal DONE, which is provided to the second DMA interface 406b. For example, in response to the signal DONE, the second DMA interface 406a may set the request signal $REQ_2$ in order to request the reading of the data stored to the output data registers DATAOUT. Accordingly, in this case the DMA channel $DMA_{T2}$ is configured to transfer the data stored to the output data registers DATAOUT. Generally, also in this case, the DMA channel $DMA_{T2}$ may be provided by an integrated DMA controller of the co-processor 40a configured to directly read the processed data from the output data registers DATAOUT, or a general-purpose DMA controller configured to read the processed data from the output data registers DATAOUT via the slave interface 410.

In various embodiments, the DMA channel $DMA_{T2}$ is configured to generate an acknowledge signal $ACK_2$ once the data stored to the output data registers DATAOUT have been transferred. Specifically, in various embodiments, the second interface 406b is configured to generate a synchronization signal SYNC in response to this acknowledge signal $ACK_2$, thereby indicating when the data stored to the output data registers DATAOUT have been transferred. For example, the synchronization signal SYNC may directly correspond to the acknowledge signal $ACK_2$. For example, in response to the signal SYNC, the first DMA interface 406a may set the request signal $REQ_1$ in order to request the transfer of new data.

Accordingly, by configuring in a suitable manner the cryptographic co-processor 40a, e.g., via the slave interface 410, the cryptographic co-processor 40a may be configured to:
- assert the request signal $REQ_1$ in order to requests the transfer of an AES block to the input data registers DATAIN and optionally the command ENCCMD to the control register(s) CONTROL;
- execute the requested cryptographic operation, e.g., as indicated via the command ENCCMD;
- when the cryptographic processing of the current AES block is completed (as signaled via the signal DONE), assert the request signal $REQ_2$ in order to request the transfer of the processed AES block from the output data registers DATAOUT; and
- once the data have been transferred from the output data registers DATAOUT (as signaled via the signal SYNC), process the next AES block.

Specifically, as mentioned before, in order to process the data OD, the processing core 102 may be configured to send a first command INIT used to initialize the cryptographic processing circuit 404, while the command ENCCMD may correspond to a second command DATA_APPEND specifying that a given operation belongs to an already initialized cryptographic processing operation. For example, the DMA interface 406a may be configured to set the request signal $REQ_1$ for the first time in response to receiving the command INIT (and then as a function of the synchronization signal SYNC).

Accordingly, the solution described in the foregoing permits to automatically process the original data OD, wherein the processed data stored to the output data registers DATAOUT are automatically transferred via the DMA channel $DMA_{T2}$ once the request signal $REQ_2$ is set. Specifically, in response to determining that the request signal $REQ_2$ is set, the DMA channel $DMA_{T2}$ transfers one AES block of processed data, i.e., 16 bytes.

Figure 1:
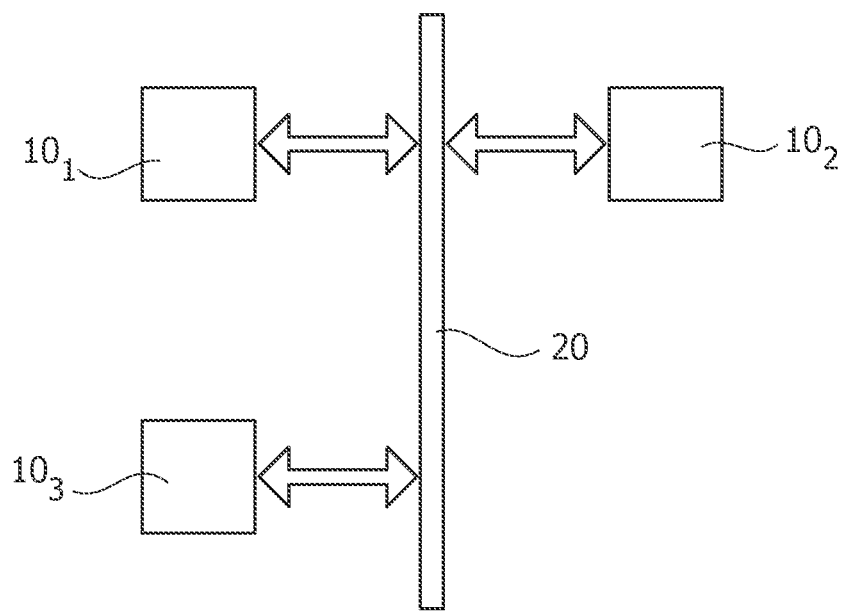
FIG. 1 shows an example of an electronic system comprising a plurality of processing systems.
Figure 2:
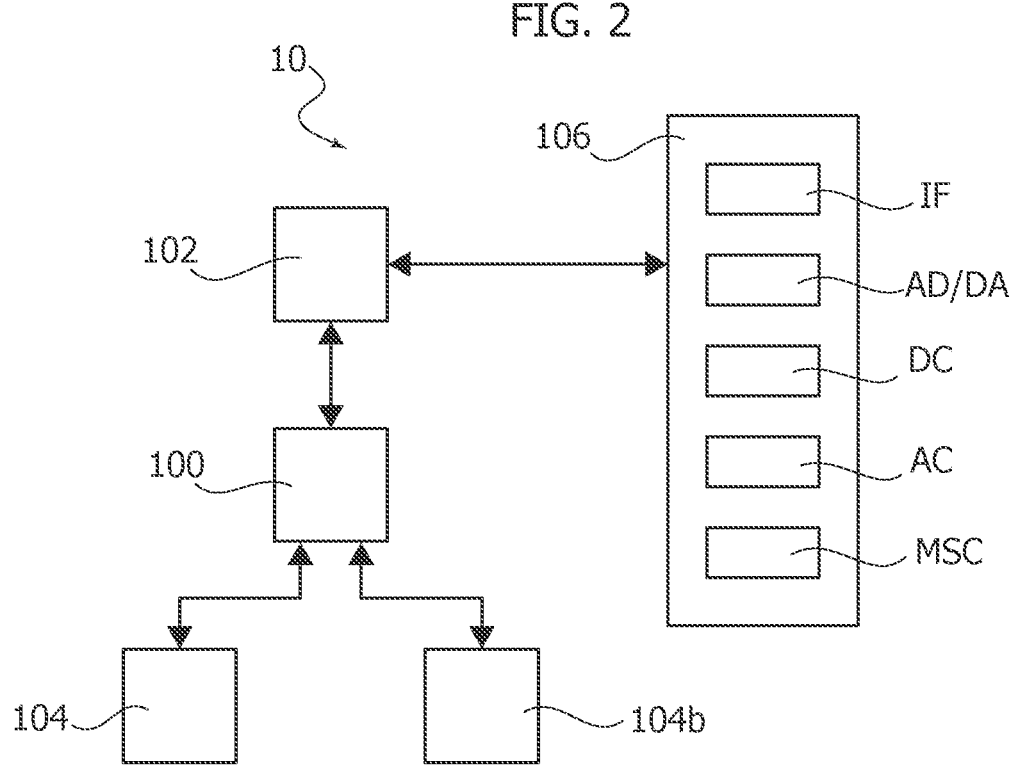
FIGS. 2 and 3 show examples of processing systems.
Figure 3:
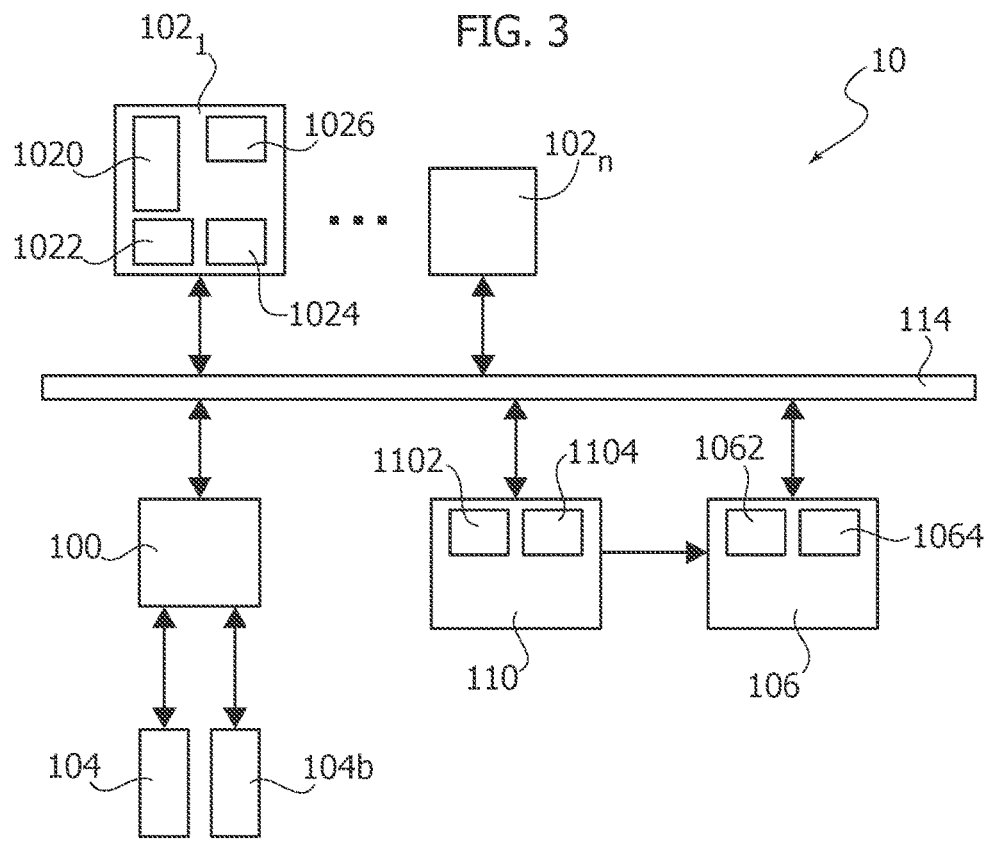
Figure 4:
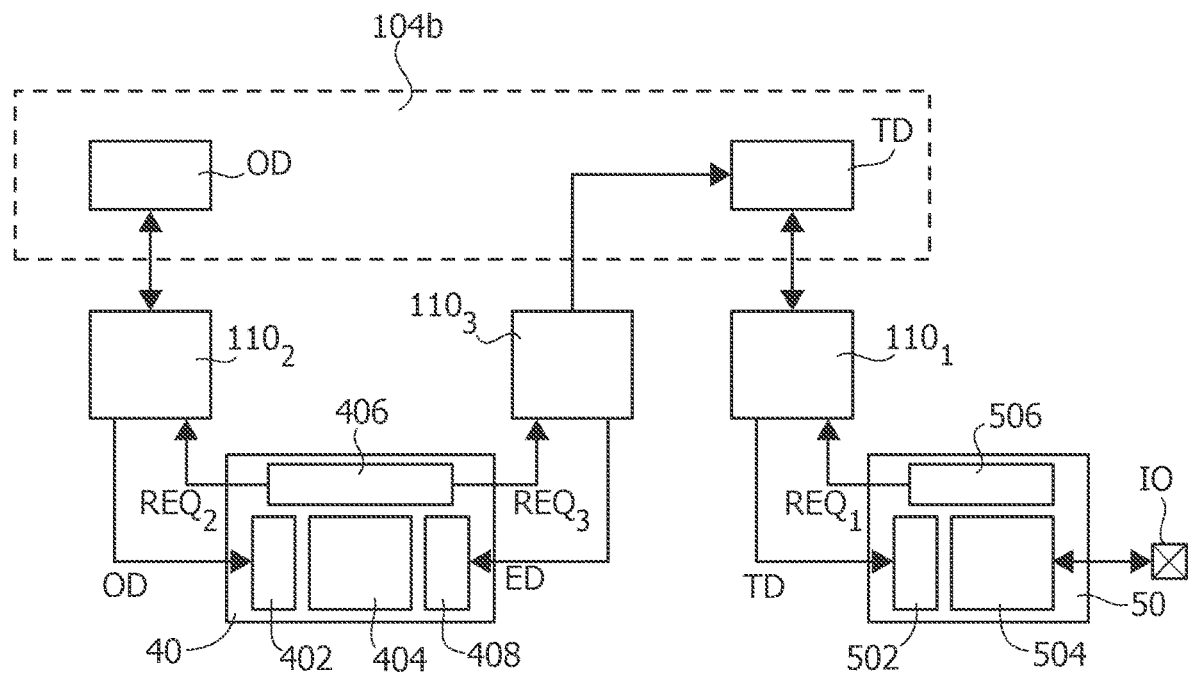
FIG. 4 shows an example of a processing system configured to encrypt data and transmit the encrypted data.

For example, with respect to the arrangement shown in FIG. 4, the DMA channel $DMA_{T2}$ could be configured to transfer the processed data to the memory 104b.

Figure 8:
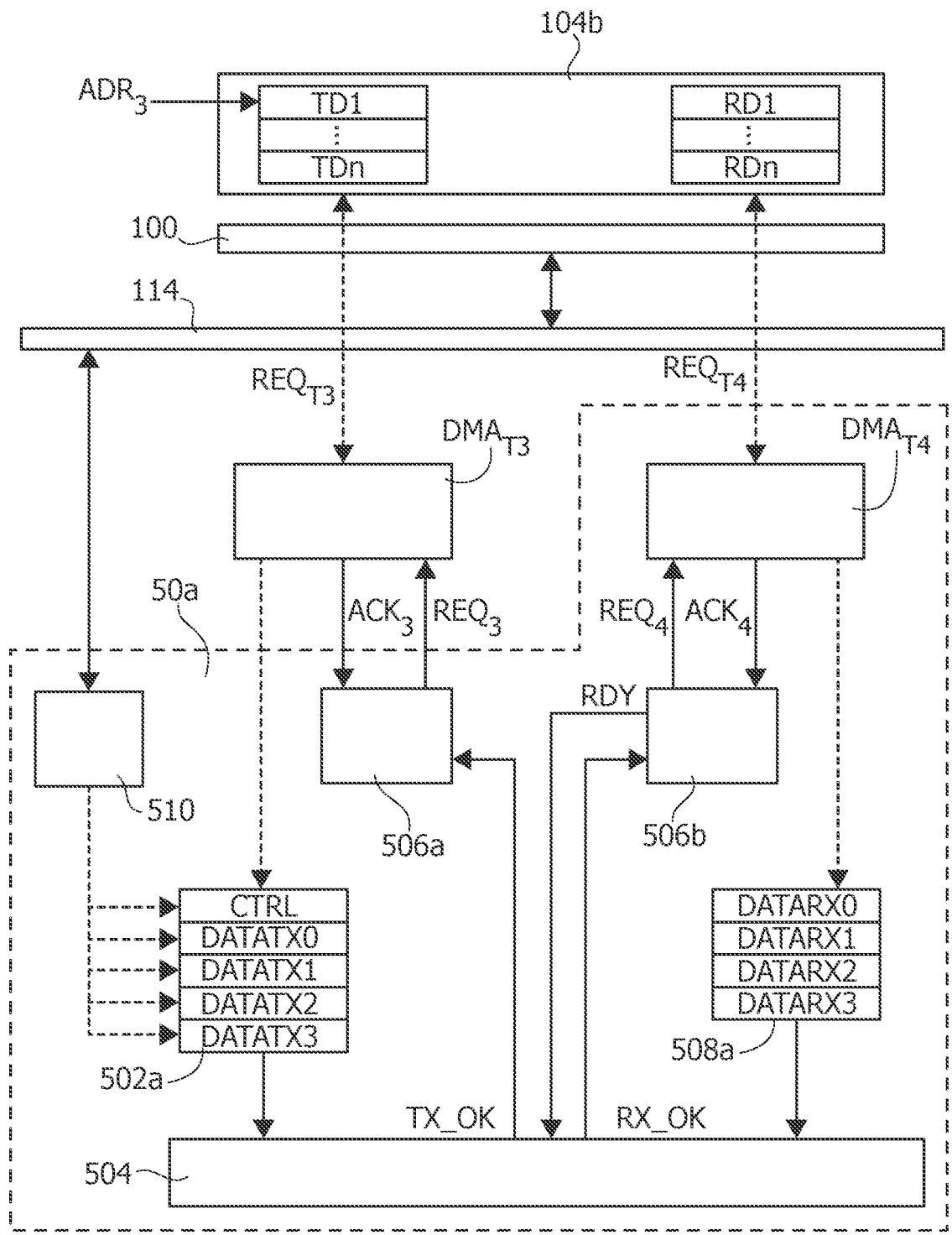
FIG. 8 shows an embodiment of a processing system comprising a serial communication interface, such as a SIPI communication interface.

Conversely, FIG. 8 shows an embodiment of a SIPI communication interface 50a.

Specifically, in the embodiment considered, the SIPI communication interface 50a comprises a SIPI (Zipwire) hardware communication interface 504 configured to transmit data or receive data. Generally, in case of a streaming application, the SIPI protocol is based on frames comprising a SIPI payload of 32 bytes (256 bit) for each transmission.

Accordingly, the hardware communication interface 506 has associated registers DATATX for storing the data to be transmitted and registers DATARX for storing received data. For example, assuming a 64-bit processing system 10a, the SIPI communication interface 50a may comprise:
- four transmission data registers DATATX0, . . . DATATX3, each having 8 bytes (64 bits), for storing data to be transmitted; and
- four reception data registers DATARX0, . . . DATARX3, each having 8 bytes (64 bits), for storing the received data.

Typically, the number and dimension of the transmission and reception data registers DATATX and DATARX depend on the number w of bits transmitted via the communication system 114. Specifically, the dimension of the transmission and reception data registers DATATX and DATATRX corresponds to the number w, and the number m of the registers may be calculated as 256/w. For example, in case of a 32-bit (i.e., w=32) system, eight (i.e., m=256/w=8) registers DATATX0, . . . DATATX7, with a size of 32 (i.e., w) bits would be used. Moreover, the same number of reception data registers DATARX may be used, or the registers DATATX may be used to store the data to be transmitted and the received data.

Moreover, the hardware communication interface 504 has associated one or more control registers CTRL for storing control data. For example, in various embodiments the (or each) control register has w bits, such as 64 bits.

For example, as schematically shown in FIG. 8, the SIPI communication interface 50a may comprise a slave interface 510 connected to the communication system 114 and configured to interface the control register(s) CTRL, the transmission data registers DATATX and the reception data registers DATARX with the communication system 114.

For example, in this way, a processing core 102 may send a sequence of requests REQ to the slave interface 510 in order to transmit data by writing the content of the transmission data registers DATATX and the content of the control register(s) CTRL. Similarly, the processing core 102 could send a sequence of requests REQ to the slave interface 510 in order to read the received data from the reception data registers DATARX.

Accordingly, in the embodiment considered, the SIPI hardware communication interface 504 is configured to transmit the data stored to the transmission data registers DATATX as a function of the control data stored to the control register(s) CTRL. For example, the control data may indicate one or more data to be included in the SIPI header added to the SIPI payload. For example, the control data may indicate a channel number.

As shown in FIG. 8, in the embodiment considered, the SIPI communication interface 50a comprises also two DMA interfaces 506a and 506b. Specifically, the first interface 506a is a connected to a DMA channel $DMA_{T3}$ and generates a first request signal $REQ_3$ used to request new data to be transmitted. Conversely, the second interface 506b is connected to a DMA channel $DMA_{T4}$ and generates a second request signal $REQ_4$ used to request the reading of the received data. Generally, the DMA channel $DMA_{T3}$ and/or the DMA channel $DMA_{T4}$ may be implemented with a general-purpose DMA controller, or via an integrated DMA controller, which may be configured to send read or write requests, respectively, either to the communication system 114 or directly the memory controller 110. For example, as schematically shown in FIG. 8, in various embodiments, the DMA channel $DMA_{T3}$ is implemented with a general-purpose DMA channel, which thus transfers data to the registers DATATX via the slave interface 510, while the DMA channel $DMA_{T4}$ is an integrated DMA write channel implemented in the SIPI communication interface 50a, which thus transfers data directly from the registers DATARX either to the communication system 114 or directly to the memory controller 100.

For example, in various embodiments, a data transmission may be started by first writing the content of the control register(s) CTRL, and then writing the data to be transmitted to the transmission data registers DATATX, wherein the writing of the last input data register automatically starts the data transmission. In various embodiments, once having completed the transmission of a SIPI frame, the SIPI hardware communication interface 504 may assert a signal TX_OK. For example, in response to the signal TX_OK, the DMA interface circuit 506a may set the request signal $REQ_3$, thereby requesting new data.

Accordingly, in order to transmit data TD1 . . . TDn stored to the memory 104b, a processing core 102 may configure a DMA channel, such as the DMA channel $DMA_{CH1}$ of a DMA controller 110a described with respect to FIG. 6, to transfer via the inner loop m data packets (i.e., the number of transmission data registers DATAIN) from a source address to a target address. In this case, the source address is initialized to the address $ADR_3$ of the first word of transmission data TD1 and increased at the step 2008, i.e., for each data transfer. Conversely, the target address is initialized to the address associated with the first transmission data register DATATX0 and the target address is increased at the step 2008, but then reset to the initial value at the step 2014, whereby each inner loop starts from the address associated with the transmission data register DATATX0 and is then increased at the step 2008 during the inner loop.

Accordingly, by using the requests signal $REQ_3$ as request signal R of the DMA channel, it is sufficient that the processing core 102 writes one or more control registers CTRL in order to set the header information and to activate the DMA transfer, whereby the DMA interface circuit automatically requests new data via the signal $REQ_3$ when the transmission of the SIPI frame is completed (as indicated by the signal TX_OK). Generally, when using a DMA transfer, the SIPI hardware communication interface 504 may also start the data transmission in response to an acknowledge signal $ACK_3$ provided by the DMA channel $DMA_{T3}$, which could correspond to the signal A1 of the DMA channel $DMA_{CH1}$.

Similarly, once having received a new SIPI frame, the SIPI hardware communication interface 504 may assert a signal RX_OK. For example, in this case, the DMA interface circuit 506b may be configured to assert the request signal $REQ_4$, and the DMA channel $DMA_{T4}$ may be configured to transfer m packets from the reception data registers DATARX to the memory 104b, thereby sequentially storing the received data RD1 . . . RDn to the memory 104b.

In various embodiments, the DMA interface circuit 506b is configured to receive an acknowledge signal $ACK_4$ from the DMA channel $DMA_{T4}$, wherein this acknowledge signal $ACK_4$ indicates that the DMA data transfer of the m packets has been completed. Specifically, in response to this acknowledge signal $ACK_4$, the DMA interface circuit 506b may assert a ready signal RDY, which is provided to the SIPI hardware communication interface 504. Specifically, in this case, the SIPI hardware communication interface 504 may be configured to only accept new data when the signal RDY is asserted. Generally, the flow control between a SIPI transmitter and a SIPI receiver used to signal whether a receiver is available may be handled via the SIPI/LFAST protocol.

Accordingly, as described with respect to FIGS. 5 and 8, while the cryptographic co-processor 40a may use a DMA channel $DMA_{T2}$ configured to transfer k data words comprising 128 bits from the output data registers DATAOUT, the SIPI communication interface 50a may use a DMA channel $DMA_{T3}$ configured to transfer m data words comprising 256 bits. Moreover, while the DMA channel $DMA_{T2}$ receives a request signal $REQ_2$ from the DMA interface 406b, the DMA channel $DMA_{T3}$ receives a request signal $REQ_3$ from the DMA interface 506a.

In the following will now be described an embodiment of the data-exchange between the cryptographic co-processor 40a and the SIPI communication interface 50a via a DMA channel, identified in the following again with the reference signa $DMA_{T2}$.

Figure 9:
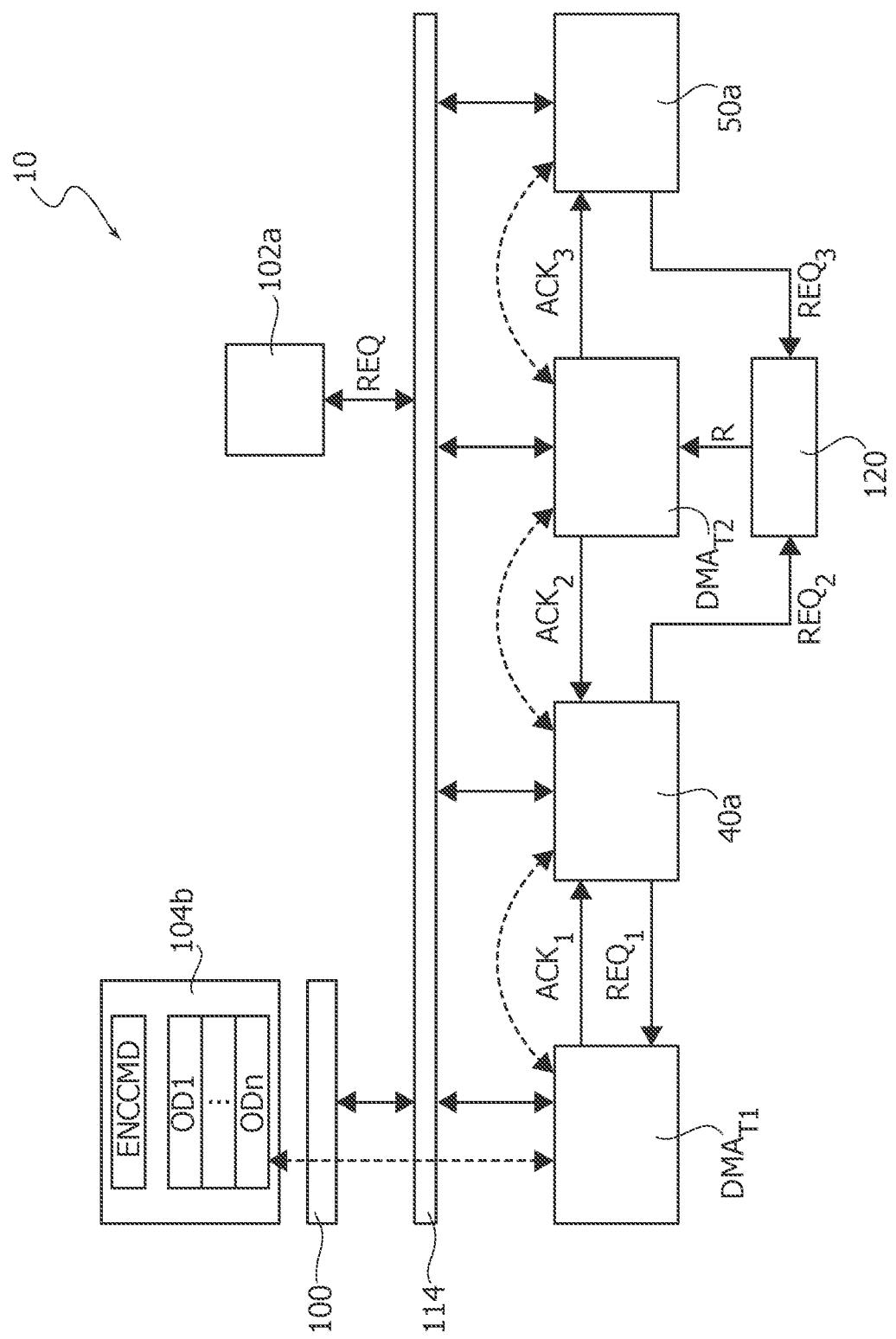
FIGS. 9, 10A, 10B, 10C, and 11 show an embodiment of a processing system configured to encrypt data and transmit the encrypted data.

Specifically, as shown in FIG. 9, in this case the processing system 10a comprises:
  the cryptographic co-processor 40a;
  the DMA channel $DMA_{T1}$ configured to transfer the data OD and optionally the encryption command ENCCMD to the input data register DATAIN and optionally the control register CONTROL of the cryptographic co-processor 40a by using the request signal $REQ_1$ and optionally the acknowledge signal $ACK_1$;
  the SIPI communication interface 50b; and
  a further DMA channel $DMA_{T2}$ configured to transfer the encrypted data from the output data register DATAOUT of the cryptographic co-processor 40a to the transmission data register DATATX of the SIPI communication interface 50b.

Generally, as shown in FIG. 8, the processing system 10a comprises also a processing core 102 configured to send requests REQ to the communication system 114, in order to configure the DMA channels $DMA_{T1}$ and $DMA_{T2}$, the cryptographic co-processor (e.g., by storing the command INIT to the control register CONTROL) and the SIPI interface (e.g., by programming the control register(s) CTRL).

Generally, the DMA channels $DMA_{T1}$ and $DMA_{T2}$ may be integrated DMA channels, e.g., of the cryptographic co-processor 40a, or preferably are channels of a general-purpose DMA controller 110a. Accordingly, for the operation of the DMA channel $DMA_{T1}$, reference can be made to the description of FIGS. 5 to 7.

Concerning the operation of the DMA channel $DMA_{T2}$, it may be observed that:

the cryptographic co-processor 40a, in particular the respective DMA interface circuit 406b, is configured to generate the request signal $REQ_2$ requesting the transfer of 128 bits from the output data register DATAOUT and receive the acknowledge signal $ACK_2$ indicating that the 128 bits have been transferred from the output data register DATAOUT; and the SIPI communication interface 50a, in particular the respective DMA interface circuit 406a, is configured to generate the request signal $REQ_3$ requesting the transfer of 256 bits to the transmission data register DATATX and receive the acknowledge signal $ACK_3$ indicating that the 256 bits have been transferred to the transmission data register DATATX.

Conversely, as described with respect to FIGS. 6 and 7, the DMA channel of a DMA controller 110a expects a single request signal R, but may generate two acknowledge signals: the acknowledge signal A1 (e.g., the signal $A1_{C1}$ for the channel $DMA_{CH1}$) indicating the completion of a minor loop and the acknowledge signal A2 (e.g., the signal $A2_{C1}$ for the channel $DMA_{CH1}$) indicating the completion of a major loop.

Accordingly, in various embodiments, the DMA channel $DMA_{T2}$ has associated (e.g., may comprise) a request control circuit 120 configured to generate the request signal R (e.g., the signal $R_{C1}$ for the channel $DMA_{CH1}$) of the DMA channel $DMA_{T2}$ as a function of the request signals $REQ_2$ and $REQ_3$. Moreover, by configuring the DMA channel $DMA_{CH1}$ to use two major loops and a number of k minor loops required to transfer 128 bits (16 bytes), the acknowledge signal A1 may be provided to the cryptographic co-processor 40a as acknowledge signal $ACK_2$ and the acknowledge signal A2 may be provided to the SIPI communication interface 50a as acknowledge signal $ACK_3$.

Specifically, this is also shown in greater detail in FIGS. 10A, 10B, 10C, and 11.

Figure 10A:
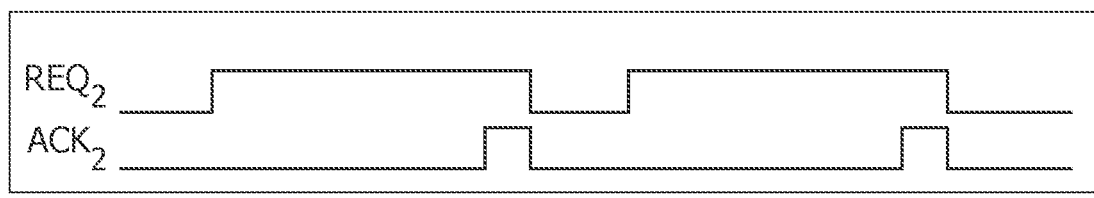

Specifically, as shown in FIG. 10A, the cryptographic co-processor 40a asserts at a given instant the request signal $REQ_2$.

Figure 10B:
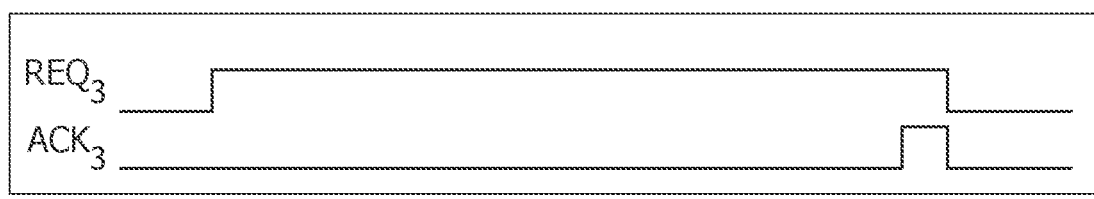
Figure 10C:
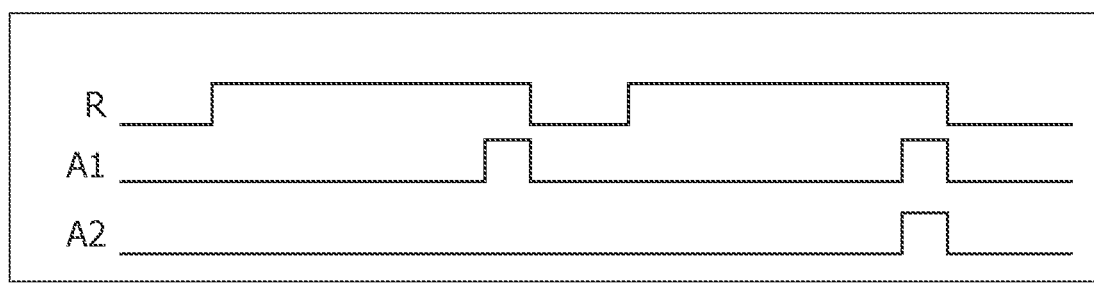

In response to the request signal $REQ_2$ and as also shown in FIG. 10C, the request control circuit 120 asserts the request signal R of the DMA channel $DMA_{T2}$. Accordingly, in response to the request signal R, the DMA channel $DMA_{T2}$ executes the first major loop comprising a number k of minor loops (steps 2002, 2004 2006 and 2008 in FIG. 7) in order to transfer 128 bits (16 bytes), e.g., by performing k=2 loops in case w=64. Once having executed the k minor loops (step 2006), the DMA channel $DMA_{T2}$ asserts the acknowledge signal A1 (step 2010), which is provided as acknowledge signal $ACK_2$ to the cryptographic coprocessor 40a.

Accordingly, in response to the acknowledge signal $ACK_2$, the cryptographic co-processor 40a de-asserts the request signal $REQ_2$, requests new data via the DMA channel $DMA_{T1}$, process the new data and, once having completed the processing operation, asserts again the request signal $REQ_2$.

In response to the request signal $REQ_2$, the request control circuit 120 asserts again the request signal R of the DMA channel $DMA_{T2}$, whereby the DMA channel $DMA_{T2}$ executes the second major loop comprising k minor loops (steps 2002, 2004 2006 and 2008 in FIG. 7) in order to transfer further 128 bits (16 bytes), and then asserts the acknowledge signal A1 (step 2010) and also the acknowledge signal A2 (step 2016).

However, indeed the request control circuit 120 should assert the request signal R only when also the request signal $REQ_3$ indicates that the SIPI communication interface 50a may receive data. Accordingly, in various embodiments, the request control circuit 120 is indeed configured to assert the request signal R when both request signals $REQ_2$ and $REQ_3$ are asserted, and de-asserts the request signal R when at least one of the request signals $REQ_2$ and $REQ_3$ is de-asserted.

Figure 11:
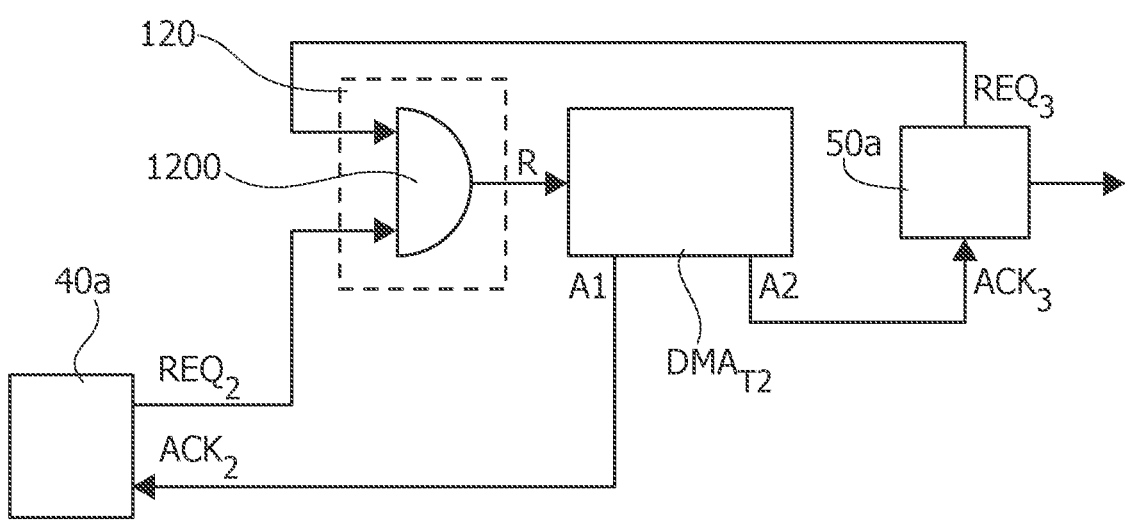

For example, this is schematically shown in FIG. 11, where the request control circuit 120 is implemented with a logic AND gate 1200 receiving at input the request signals $REQ_2$ and $REQ_3$ and providing at output the request signal R.

Generally, in case the cryptographic co-processor 40a and the SIPI communication interface 50a operate with different clock signals, i.e., are asynchronous, the request signals $REQ_2$ and/or $REQ_3$ may be synchronized via some kind of synchronization circuit, such as a sequence of flip-flops driven via the same clock signal. Generally, one of the synchronization chains may be omitted in case the clock signal corresponds to the clock signal of the cryptographic coprocessor 40a or the SIPI communication interface 50a.

Accordingly, the DMA channel $DMA_{T2}$ acknowledges via the signal A1 two data transfers of 16 bytes to the cryptographic coprocessor 40a (see FIG. 10A) and via the signal A2 a single data transfers of 32 bytes to the SIPI communication interface 50a (see FIG. 10B).

Accordingly, in various embodiments, in order to correctly transfer the data from the output data registers DATAOUT to the transmission data registers DATATX, the DMA channel $DMA_{T2}$ is configured (e.g., via the processing core 102a and the slave interface 1104) to use the following configuration:

the initial source address corresponds to the address of the first output data register DATAOUT0;

the initial target address corresponds to the address of the first transmission data register DATATX0;

the number of requested transfers (minor loops) corresponds to k;

the number of requested loops (major loops) corresponds to 2;

the source address is increased for each minor loop (step 2008), and the source address of each major loop is reset to the initial source address (e.g., by resetting the source address at the step 2014); and the target address is increased for each minor loop (step 2008), and the target address is reset to the initial target address once both major loops are completed (e.g., by resetting the target address at the step 2016).

Accordingly, in the embodiment considered, the DMA channel $DMA_{T2}$ is configured to transfer the data from the cryptographic coprocessor 40a to the SIPI communication interface 50a without storing the data temporarily to the memory 104b.

In various embodiments, a similar data transfer may also be implemented at the received side.

Specifically, FIGS. 12, 13A, 13B, 13C and 14 show an embodiment wherein the processing system 10a is configured to receive encrypted data via the SIPI communication interface 50a and decrypt the received data via the cryptographic co-processor 40a.

Specifically, in the embodiment considered (see also the description of FIG. 8), the SIPI communication interface 50a is configured to assert the request signal $REQ_4$ when new data have been received, thereby requesting the transfer of 256 bits (32 bytes). Moreover, the cryptographic co-processor 40a is configured to assert the request signal $REQ_1$ when the cryptographic co-processor 40a is available to process new data, thereby requesting the transfer of 128 bits (16 bytes).

Specifically, in the embodiment considered, a DMA channel $DMA_{T1}$ is used to transfer the received data from the reception data registers DATARX of the SIPI communication interface 50a to the input data registers DATAIN of the cryptographic co-processor 40a.

Specifically, in the embodiment considered, the request signals $REQ_4$ and $REQ_1$ are provided to a request control circuit 120, such as an AND gate 1200, configured to generate the request signal R of the DMA channel $DMA_{T1}$, wherein the (minor loop) acknowledge signal A1 is provided as acknowledge signal $ACK_1$ to the cryptographic co-processor 40a and the (major loop) acknowledge signal A2 is provides as acknowledge signal $ACK_4$ to the SIPI communication interface 50a.

Accordingly, once having received new data (as signaled via the signal RX_OK of FIG. 8), the SIPI communication interface 50a asserts the request signal $REQ_4$. Once both request signals $REQ_1$ and $REQ_4$ are asserted, the request control circuit 120 asserts the request signal R, whereby the DMA channel $DMA_{T1}$ executes k minor loops in order to transfer 128 bits (16 bytes) from the reception data registers DATARX to the input data registers DATAIN.

In various embodiments, the DMA channel $DMA_{T1}$ may also transfer at the end of a major loop a decryption command DECCMD from the memory 104b to the control register CONTROL of the cryptographic co-processor 40a. For example, for this purpose may be used the DMA controller 110a shown in FIG. 6, wherein:
- the request signal R corresponds to the request signal $R_{C1}$ to the channel $DMA_{CH1}$;
- the acknowledge signal $A1_{C1}$ is connected as request signal $R_{C1}$ to the channel $DMA_{CH2}$;
- the acknowledge signal A1 corresponds to the acknowledge signal $A1_{C2}$;
- the acknowledge signal A2 corresponds to the acknowledge signal $A2_{C2}$;
- the channel $DMA_{CH1}$ is configured to transfer the data from the reception data register DATARX to the input data register DATAIN; and
- the channel $DMA_{CH2}$ is configured to transfer the decryption command DECCMD from a fixed memory location in the memory 104b to the control register CONTROL.

Accordingly, at the end of the first major loop (as signaled via the acknowledge signal A1), the DMA channel $DMA_{T4}$ has transferred 128 bits (16 bytes) from the first half of reception data registers DATARX and optionally the command DECCMD, whereby the cryptographic co-processor executes the decryption operation in order to obtain again the original data OD. Generally, the cryptographic co-processor could also start the proceeding operation in response to the acknowledge signal $ACK_1$. Moreover, also in this case, the processing core 102 may first send a command INIT used to initialize the cryptographic processing circuit 404, and the command DECCMD may correspond to a second command DATA_APPEND specifying that a given operation belongs to an already initialized cryptographic processing operation.

Once the decryption operation is completed (as signaled via the signal DONE), the cryptographic co-processor 40a may again use the DMA channel $DMA_{T2}$ in order to transfer the data from the output data registers DATAOUT to the memory 104b. Accordingly, once the data have been transferred (as signaled via the synchronization signal SYNC), the cryptographic co-processor 40a may again assert the request signal $REQ_1$, whereby the DMA channel $DMA_{T}n$ executes the second major loop.

Accordingly, at the end of the second major loop (as signaled via the acknowledge signal A1), the DMA channel $DMA_{T4}$ has transferred 128 bits (16 bytes) from the second half of reception data registers DATARX and optionally the command DECCMD, whereby the cryptographic co-processor executes the decryption operation in order to obtain again the original data OD.

However, in this case the DMA channel $DMA_{T4}$ also asserts the acknowledge signal $ACK_4$ indicating that the 256 bits (32 bytes) have been read from the reception data register DATARX, thereby indicating that new data may be received.

Accordingly, in various embodiments, in order to correctly transfer the data from the reception data registers DATARX to the input data registers DATAIN, the DMA channel $DMA_{T}n$ (in particular the channel $DMA_{CH1}$) is configured (e.g., via the processing core 102a and the slave interface 1104) to use the following configuration:
- the initial source address corresponds to the address of the first reception data register DATARX0;
- the initial target address corresponds to the address of the first input data register DATAIN0;
- the number of requested transfers (minor loops) corresponds to k;
- the number of requested loops (major loops) corresponds to 2;
- the target address is increased for each minor loop (step 2008), and the target address of each major loop is reset to the initial target address (e.g., by resetting the source address at the step 2014); and
- the source address is increased for each minor loop (step 2008), and the source address is reset to the initial source address once both major loops are completed (e.g., by resetting the target address at the step 2016).

Figure 15:
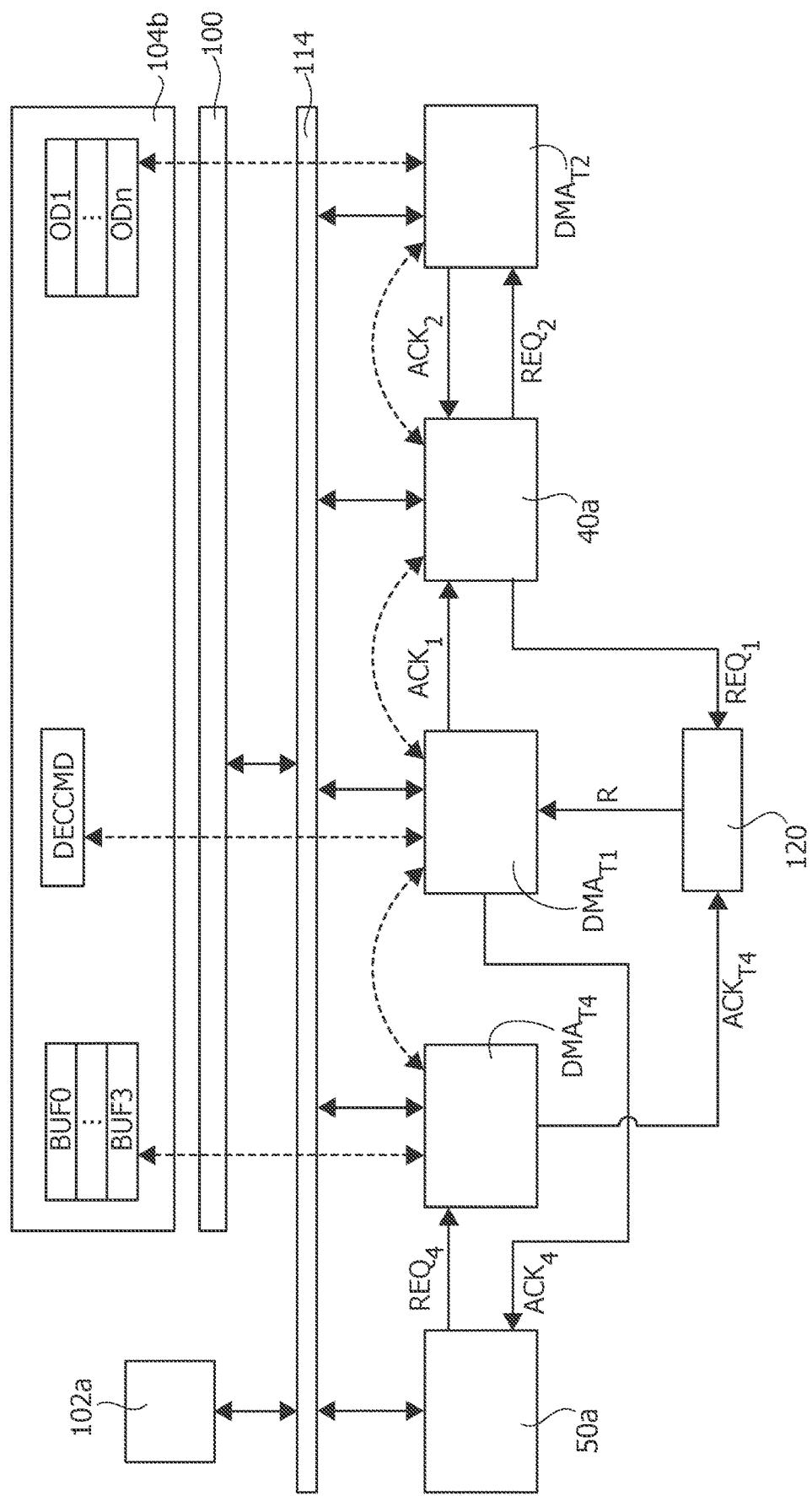
FIGS. 15, 16A, 16B, 16C and 17 show a further embodiment of a processing system configured to receive data and decrypt the received data.

Finally, FIGS. 15, 16A, 16B, 16C and 17 show an embodiment, wherein the SIPI communication interface already comprises an integrated DMA interface $DMA_{T4}$ (which in FIG. 15 is shown separately just for clarity reasons) configured to always transmit 256 bits directly to the memory controller 100.

In this case, the DMA channel $DMA_{T4}$ may be configured, in response to the request signal $REQ_4$ generated by the DMA interface circuit 506b, to transfer the 256 bits from the reception data registers DATARX to a memory area in the volatile memory 104b, indicated in FIG. 15 as buffer BUF, wherein the number of memory locations, such as BUF0 to BUF3, of the buffer BUF corresponds to the number m of reception data registers DATARX.

For example, in this case, a simple DMA controller may be used which only executes a given number of requested transfers (minor loops), e.g., by using the steps 2002, 2004, 2006, 2008 and 2010, wherein the DMA channel returns to the step 2002 after the step 2010 (see FIG. 7). For example, in this case, in order to correctly transfer the data from the reception data registers DATARX to the buffer BUF, the DMA channel $DMA_{T4}$ is configured (e.g., via the processing core 102a and the slave interface 1104) to use the following configuration:
- the initial source address corresponds to the address of the first reception data register DATARX0 (this value may also be fixed in case of a custom DMA channel);
- the initial target address corresponds to the address of the first buffer memory location BUF0;
- the number of requested transfers to be executed corresponds to m (this value may also be fixed in case of a custom DMA channel);
- the source address is increased for each transfer (step 2008), and the source address is reset at the end of the m transfers to the initial source address (e.g., by resetting the source address at the step 2010); and
- the target address is increased for each transfer (step 2008), and the target address is reset at the end of the m transfers to the initial target address (e.g., by resetting the source address at the step 2010).

Also in this case, the DMA channel $DMA_{T4}$ generates an acknowledge signal $ACK_{T4}$ when the requested number of transfers has been executed (step 2010). However, in this case, the acknowledge signal $ACK_{T4}$ generated by the DMA channel $DMA_{T4}$ (and indicating that the transfer of the 256 bits has been completed) is not provided to the DMA interface circuit 506b, but to the request control circuit 120.

Accordingly, in response to the acknowledge signal $ACK_{T4}$ and the request signal $REQ_1$ generated by the cryptographic co-processer 40a, the request control circuit 120 may assert the request signal R of the DMA channel $DMA_{T}$n. Specifically, in this case, the DMA channel $DMA_{T1}$ is essentially configured as in the embodiment shown with respect to FIG. 12, but instead of using the addresses of the reception data registers DATARX as source address, the source address points now to the addresses associated with the buffers BUF.

Specifically, for this purpose, the DMA channel $DMA_{T1}$ may be implemented with the DMA controller 110a shown in FIG. 6, wherein:
- the request signal R corresponds to the request signal $R_{C1}$ to the channel $DMA_{CH1}$;
- the acknowledge signal $A1_{C1}$ is connected as request signal $R_{C1}$ to the channel $DMA_{CH2}$;
- the acknowledge signal A1 corresponds to the acknowledge signal $A1_{C2}$;
- the acknowledge signal A2 corresponds to the acknowledge signal $A2_{C2}$;
- the channel $DMA_{CH1}$ is configured to transfer the data from the buffer BUF to the input data register DATAIN; and
- the channel $DMA_{CH2}$ is configured to transfer the decryption command DECCMD from a fixed memory location in the memory 104b to the control register CONTROL.

Specifically, in various embodiments, in order to correctly transfer the data from the buffer BUF to the input data registers DATAIN, the DMA channel $DMA_{T1}$ (in particular the channel $DMA_{CH1}$) may be configured (e.g., via the processing core 102a and the slave interface 1104) to use the following configuration:
- the initial source address corresponds to the address of the first buffer location BUF0;
- the initial target address corresponds to the address of the first input data register DATAIN0;
- the number of requested transfers (minor loops) corresponds to k;
- the number of requested loops (major loops) corresponds to 2;
- the target address is increased for each minor loop (step 2008), and the target address of each major loop is reset to the initial target address (e.g., by resetting the source address at the step 2014); and
- the source address is increased for each minor loop (step 2008), and the source address is reset to the initial source address once both major loops are completed (e.g., by resetting the target address at the step 2016).

Accordingly, in this case, the DMA channel $DMA_{T1}$ transfers during the first major loop the data from the first half of the buffers BUF, such as buffers BUF0 and BUF1, to the input data registers DATAIN, and optionally the command DECCMD to the control register CONTROL. Similarly, the DMA channel $DMA_{T1}$ transfers during the second major loop the data from the second half of the buffers BUF, such as buffers BUF2 and BUF3, to the input data registers DATAIN, and optionally the command DECCMD to the control register CONTROL.

Accordingly, once the second major loop is completed, the DMA channel $DMA_{T1}$ asserts the acknowledge signal A2, which is provided as acknowledge signal $ACK_4$ to the DMA interface circuit 506b of the SIPI communication interface 50a.

Figure 12:
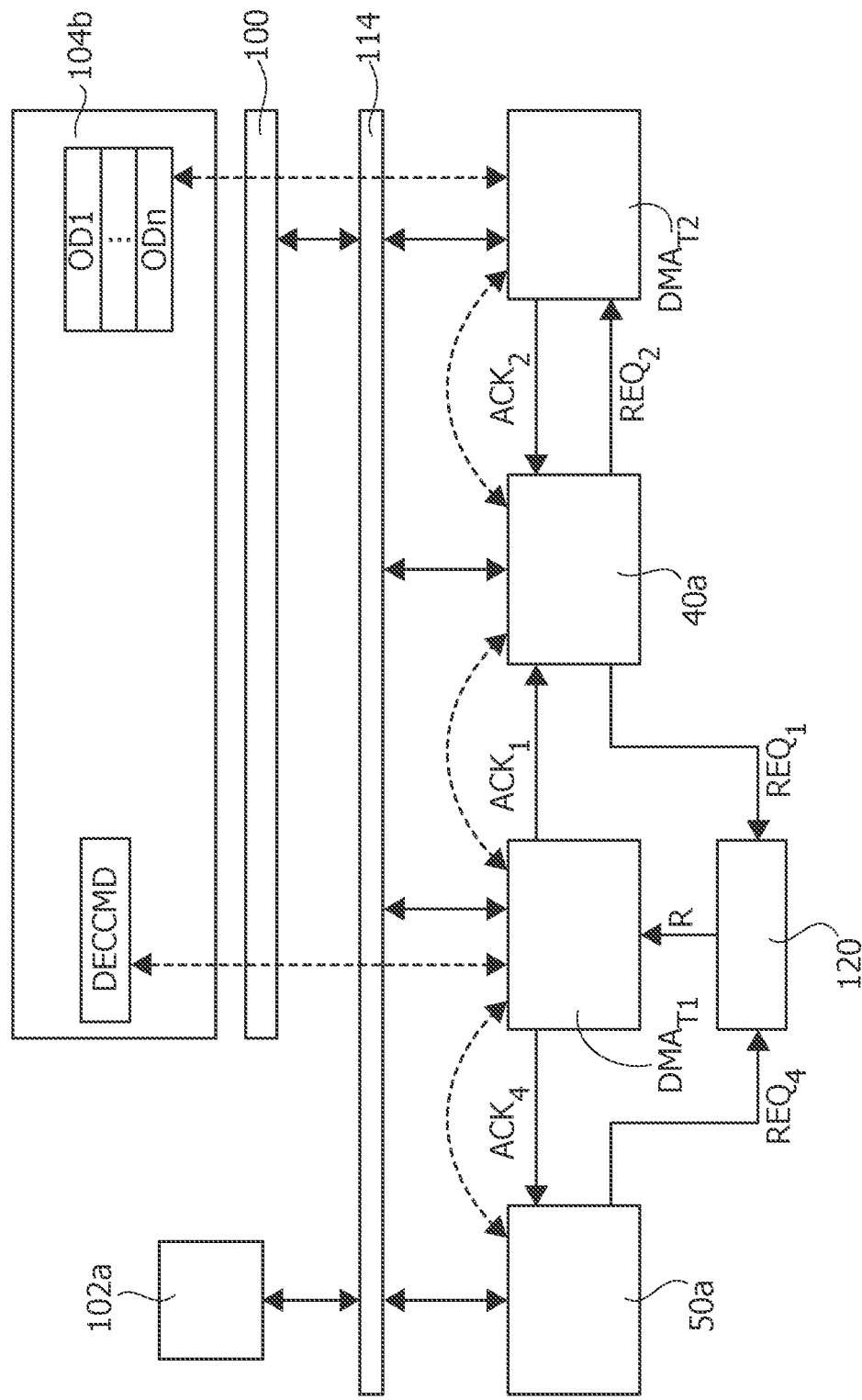
FIGS. 12, 13A, 13B, 13C and 14 show an embodiment of a processing system configured to receive data and decrypt the received data.
Figure 13A:
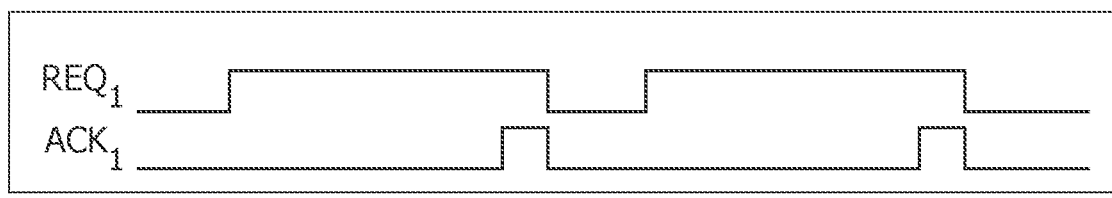
Figure 13B:
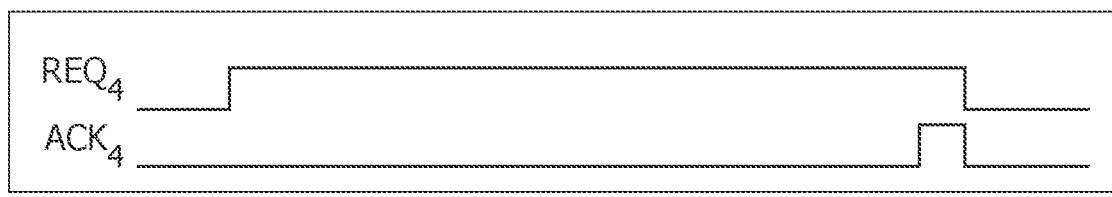
Figure 13C:
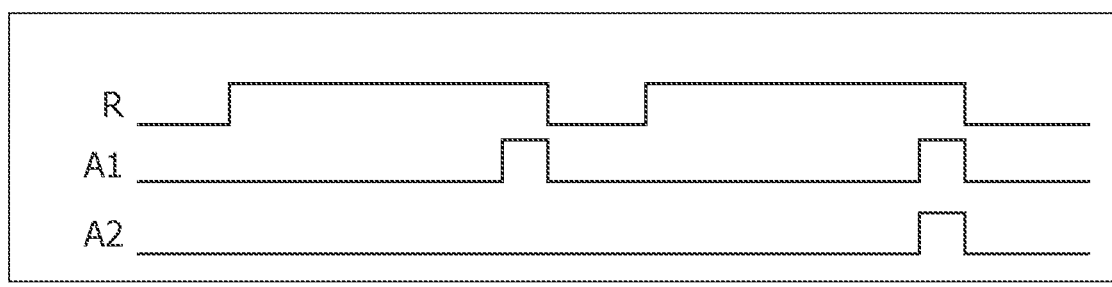
Figure 16A:
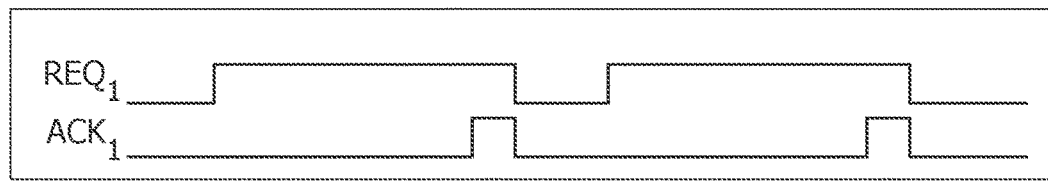

Accordingly, as shown in FIG. 16A, the signals exchanged with the cryptographic co-processor 40a essentially are same as for the embodiment of FIG. 12 (see FIG. 13A).

Figure 16B:
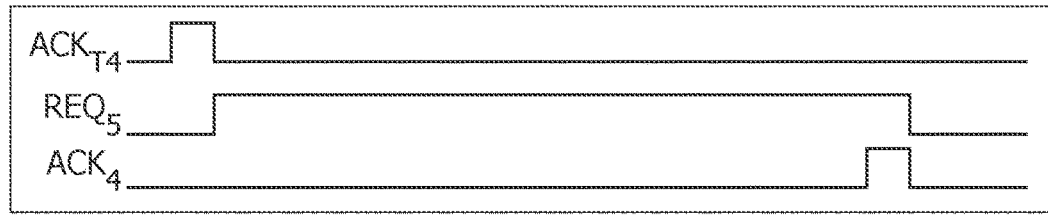
Figure 16C:
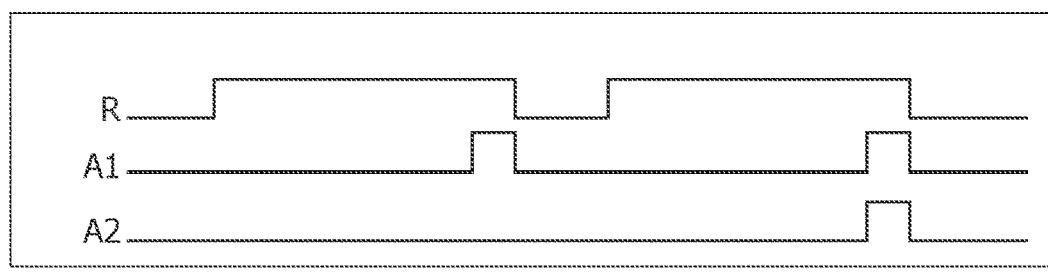

However, an acknowledge signal is typically only a trigger signal, e.g., asserted for a single clock signal. Accordingly, as shown in FIG. 16B, in various embodiments, in order to emulate the behavior of the request signal $REQ_4$ used in the embodiment of FIG. 12, the request control circuit 120 may be configured to assert a request signal $REQ_5$ when the signal $ACK_{T4}$ is asserted. Conversely, the request control circuit 120 may de-assert the request signal $REQ_5$ in response to the acknowledge signal A2 correspond to the acknowledge signal $ACK_4$. For example, for this purpose, the request control circuit 120 may comprise a set-reset flip-flop or latch 1202, wherein:
- the signal $ACK_{T4}$ is connected to a set terminal of the flip-flop or latch 1202;
- the acknowledge signal $ACK_4$ is connected to a reset terminal of the flip-flop or latch 1202; and
- an output terminal of the flip-flop or latch 1202 provides the request signal $REQ_5$.

Figure 14:
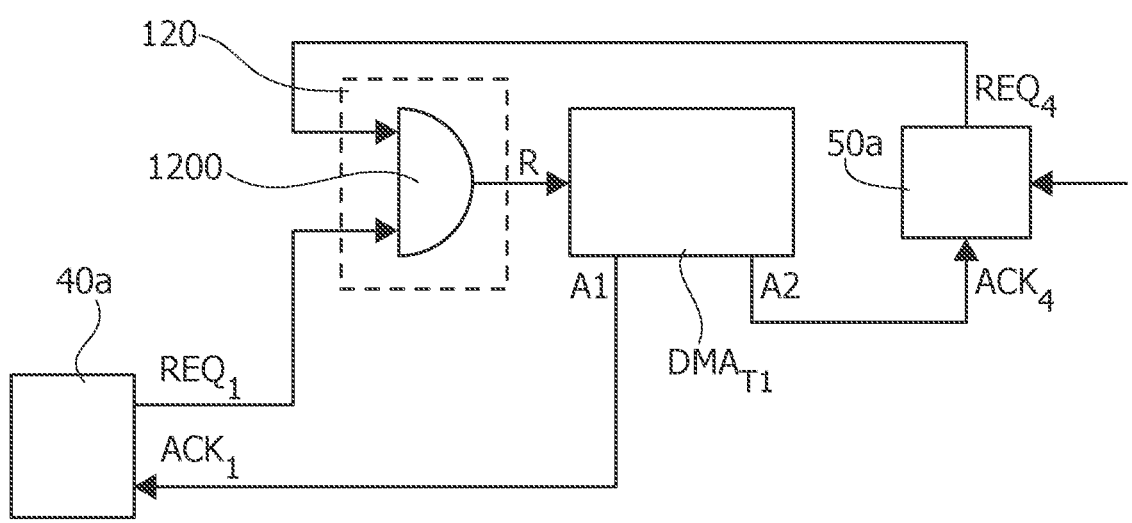
Figure 17:
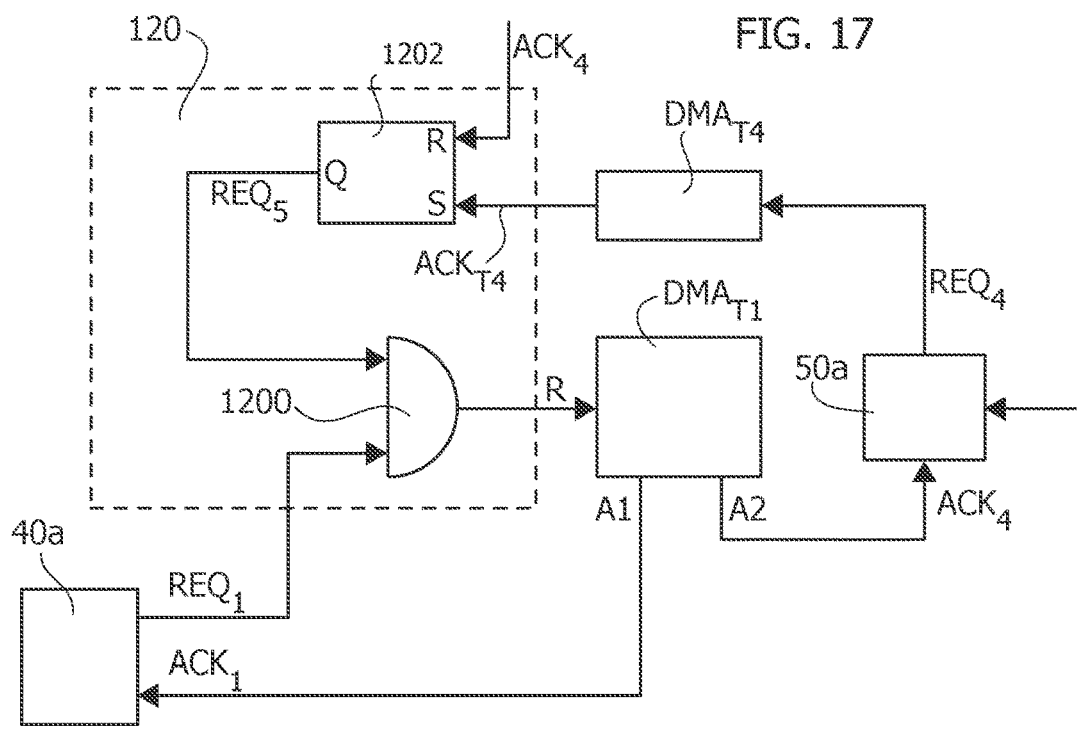

Accordingly, in the embodiments shown in FIGS. 14 and 17, the SIPI interface 50a stores the received data to a storage element having m slots, i.e., the buffer BUF or directly the reception data registers DATARX.

Moreover, the SIPI interface generates a control signal when 32 bytes have been written to the storage element, i.e., the signal $ACK_{T4}$ when the data have been stored to the buffer BUF or directly the signal RX_OK when the data have been stored to the reception data registers DATARX.

In response to this control signal, a DMA interface circuit generates a request signal requesting that the data stored to the storage area are transferred to the cryptographic co-processor 40a. Specifically, in FIG. 14, this operation is implemented in the DMA interface circuit 506b, which asserts the request signal $REQ_4$ in response to the signal TX_OK, and de-asserts the request signal $REQ_4$ in response to the acknowledge signal $ACK_4$. Conversely, in FIG. 17, the set-reset register or latch 1202 generating the request signal REQ$_5$ emulates the same behavior, because also this circuit asserts the request signal REQ$_5$ in response to the signal ACK$_{T4}$ and de-asserts the request signal in response to the acknowledge signal ACK$_4$. In both cases, the acknowledge signal ACK$_4$ signals to the SIPI interface 50a that the data have been read from the storage element.

Accordingly, the solutions disclosed in the foregoing permit that a processing core 102a configures the DMA channels, the SIPI communication interface 50a and the cryptographic co-processor 40a, in order to:
- transmit a stream of encrypted data generated for the data OD stored to the memory 104b; or
- receive a stream of encrypted data and store the decrypted data OD to the memory 104b.

For example, with respect to the transmission chain, once having programmed the respective configuration to the DMA channels, the SIPI communication interface and the cryptographic co-processor, it is sufficient that the processing core 102a sends a command to the cryptographic co-processor 40a, such as the command INIT, in order to start the streaming operation of the encrypted data. In this respect, the (major loop) acknowledge signal A2 of the DMA channel DMA$_{T1}$ may also be used to generate an interrupt for the processing core 102a, thereby signaling that the original data OD have been processed.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A processing system comprising:
   a microprocessor programmable via software instructions;
   a memory controller configured to be coupled to a memory;
   a communication system coupling the microprocessors to the memory controller;
   a cryptographic co-processor comprising:
      a plurality of input data registers configured to store a first block of data having a plurality of bytes, wherein the number of input data registers corresponds to a first number of registers,
      a plurality of output data registers configured to store a first block of processed data, wherein the number of output data registers corresponds to the first number of registers,
      a first control register programmable by the microprocessor and configured to store first configuration data,
      a cryptographic processing circuit configured to process the data stored to the input data registers as a function of the first configuration data stored to the first control register, and store respective processed data to the output data registers, wherein the cryptographic processing circuit is configured to generate a first control signal when the processed data have been stored to the output data registers,
      a first DMA interface circuit configured to generate a first request signal requesting that a new first block of data be transferred to the input data registers by:
         asserting the first request signal as a function of the first configuration data stored to the first control register and in response to a synchronization signal, and
         de-asserting the first request signal in response to a first acknowledge signal,
      a second DMA interface circuit configured to generate a second request signal requesting that a first block of processed data be transferred from the output data registers by:
         asserting the second request signal as a function of the first control signal, and
         de-asserting the second request signal in response to a second acknowledge signal, wherein the second DMA interface circuit is configured to assert the synchronization signal in response to the second acknowledge signal;
   a first communication interface comprising:
      a plurality of transmission data registers configured to store a second block of data having a plurality of bytes, wherein the number of transmission data registers corresponds to a second number of registers,
      a second control register programmable by the microprocessor and configured to store second configuration data,
      a hardware communication interface configured to transmit the data stored to the transmission data registers as a function of the second configuration data stored to the second control register, wherein the hardware communication interface is configured to generate a second control signal when the data stored to the transmission data registers have been transmitted, and
      a third DMA interface circuit configured to generate a third request signal requesting that a new second block of data be transferred to the transmission data registers by:
         asserting the third request signal as a function of the second configuration data stored to the second control register and in response to the second control signal, and
         de-asserting the third request signal in response to a third acknowledge signal;
   a first DMA channel configured to:
      in response to the first request signal, send requests to the memory controller to transfer a new first block of data from the memory to the input data registers, and
      once having transferred the new first block of data from the memory to the input data registers, assert the first acknowledge signal;
   a second DMA channel configured to:
      receive an initial source address and an initial target address, wherein the initial source address corresponds to an address associated with a first register of the output data registers and the initial target address corresponds to an address associated with a first register of the transmission data registers,
      set a source address to the initial source address and a target address to the initial target address,
      in response to a DMA request signal, execute a given number of data transfer operations from the source address to the target address, wherein the given number of data transfer operations corresponds to the first number of registers, and wherein the source address and the target address are increased for each data transfer operation,
      once the given number of data transfer operations has been executed, assert the second acknowledge signal and reset the source address to the initial source address, and assert the third acknowledge signal and reset the target address to the initial target address; and a request control circuit configured to:
asssert the DMA request signal in response to determining that the second request signal and the third request signal are asserted, and
de-assert the DMA request signal in response to determining that the second request signal or the third request signal are de-asserted.

2. The processing system of claim 1, wherein the first block of data comprises 16 bytes, and wherein the second block of data comprises 32 bytes.

3. The processing system of claim 1, wherein the first communication interface is a Serial Inter-Processor Interface (SIPI).

4. The processing system of claim 1, wherein the second number of registers corresponds to the double of the first number of registers.

5. The processing system of claim 1, wherein the second DMA channel is configured to perform the steps of executing the given number of data transfer operations from the source address to the target address, and asserting the first acknowledge signal and resetting the target address to the initial target address once the given number of data transfer operations has been executed, two times after setting the source address to the initial source address and a target address to the initial target address.

6. The processing system of claim 1, comprising a further DMA channel configured to, once a new first block has been stored to the input data registers, transfer a command from a fixed source address to an address associated with the first control register.

7. The processing system of claim 1, wherein the cryptographic processing circuit is an Advanced Encryption Standard (AES) processing circuit.

8. The processing system of claim 1, wherein the first DMA channel and the second DMA channel are implemented with programmable general-purpose DMA controllers configured to transfer data by sending a read request to the respective source address, and sending a write request comprising data received in response to the read request to the respective target address.

9. The processing system of claim 1, wherein the processing system is integrated in an integrated circuit.

10. The processing system of claim 1, wherein the processing system is implemented in a device comprising a plurality of processing systems coupled via a further communication system.

11. The processing system of claim 10, wherein the device is a vehicle.

12. A processing system comprising:
a microprocessor programmable via software instructions;
a memory controller configured to be coupled to a memory;
a communication system coupling the microprocessors to the memory controller;
a cryptographic co-processor comprising:
a plurality of input data registers configured to store a first block of data having a plurality of bytes, wherein the number of input data registers corresponds to a first number of registers,
a plurality of output data registers configured to store a first block of processed data, wherein the number of output data registers corresponds to the first number of registers,
a first control register programmable by the microprocessor and configured to store first configuration data,
a cryptographic processing circuit configured to process the data stored to the input data registers as a function of the first configuration data stored to the first control register, and store respective processed data to the output data registers, wherein the cryptographic processing circuit is configured to generate a first control signal when the processed data have been stored to the output data registers,
a first DMA interface circuit configured to generate a first request signal requesting that a new first block of data be transferred to the input data registers by:
asserting the first request signal as a function of the first configuration data stored to the first control register and in response to a synchronization signal, and
de-asserting the first request signal in response to a first acknowledge signal,
a second DMA interface circuit configured to generate a second request signal requesting that a first block of processed data be transferred from the output data registers by:
asserting the second request signal as a function of the first control signal, and
de-asserting the second request signal in response to a second acknowledge signal, wherein the second DMA interface circuit is configured to assert the synchronization signal in response to the second acknowledge signal;
a first communication interface having associated a storage element having a plurality of slots configured to store a second block of data having a plurality of bytes, wherein the number of slots corresponds to a second number, the first communication interface comprising:
a hardware communication interface configured to receive data and store the received data to the slots of the storage element, wherein the hardware communication interface is configured to generate a second control signal when the hardware communication interface has stored a plurality of bytes to the slots of the storage element, and
a third DMA interface circuit configured to generate a third request signal requesting that a second block of data be transferred from the slots of the storage element by:
asserting the third request signal in response to the second control signal, and
de-asserting the third request signal in response to a third acknowledge signal;
a first DMA channel configured to:
in response to the second request signal, send requests to the memory controller to transfer a first block of data from the output data registers to the memory, and
once having transferred the first block of data from the output data registers to the memory, assert the second acknowledge signal;
a second DMA channel configured to:
receive an initial source address and an initial target address, wherein the initial source address corresponds to an address associated with a first slot of the storage element and the initial target address corresponds to an address associated with a first register of the input data registers, set a source address to the initial source address and a target address to the initial target address, in response to a DMA request signal, execute a given number of data transfer operations from the source address to the target address, wherein the given number of data transfer operations corresponds to the first number of registers, and wherein the source address and the target address are increased for each data transfer operation, once the given number of data transfer operations has been executed, assert the first acknowledge signal and reset the target address to the initial target address, and assert the third acknowledge signal and reset the source address to the initial source address; and a request control circuit configured to:

assert the DMA request signal in response to determining that the first request signal and the third request signal are asserted, and de-assert the DMA request signal in response to determining that the first request signal or the third request signal are de-asserted.

13. The processing system of claim 12, wherein the first communication interface is a Serial Inter-Processor Interface (SIPI).

14. The processing system of claim 12, wherein the second number corresponds to the double of the first number of registers.

15. The processing system of claim 12, wherein the second DMA channel is configured to perform the steps of executing the given number of data transfer operations from the source address to the target address, and asserting the first acknowledge signal and resetting the target address to the initial target address once the given number of data transfer operations has been executed, two times after setting the source address to the initial source address and a target address to the initial target address.

16. The processing system of claim 12, wherein the first block of data comprises 16 bytes, and wherein the second block of data comprises 32 bytes, and wherein the hardware communication interface is configured to generate the second control signal when the hardware communication interface has stored 32 bytes to the slots of the storage element.

17. The processing system of claim 16, wherein the storage element is implemented with reception data registers of the first communication interface, wherein the hardware communication interface is configured to assert the second control signal when the hardware communication interface has stored 32 bytes to the reception data registers (DATARX), and wherein the initial source address corresponds to an address associated with a first register of the reception data registers.

18. The processing system of claim 16, wherein the storage element is implemented with memory slots in the memory, and wherein the hardware communication interface comprises:

a plurality of reception data registers, wherein the hardware communication interface is configured to assert a third control signal when the hardware communication interface has stored 32 bytes to the reception data registers; and a third DMA channel configured to:

in response to the third control signal, transfer the 32 bytes from the reception data registers to the memory slots in the memory, and once having transferred the 32 bytes from the reception data registers to the memory slots in the memory, assert the second control signal, wherein the initial source address corresponds to an address associated with a first memory slot of the memory slots in the memory.

19. The processing system of claim 12, comprising a further DMA channel configured to, once a new fist block has been stored to the input data registers, transfer a command from a fixed source address to an address associated with the first control register.

20. The processing system of claim 12, wherein the cryptographic processing circuit is an Advanced Encryption Standard (AES) processing circuit.

21. The processing system of claim 12, wherein the first DMA channel and the second DMA channel are implemented with programmable general-purpose DMA controllers configured to transfer data by sending a read request to the respective source address, and sending a write request comprising data received in response to the read request to the respective target address.

22. The processing system of claim 12, wherein the processing system is integrated in an integrated circuit.

23. The processing system of claim 12, wherein the processing system is implemented in a device comprising a plurality of processing systems coupled via a further communication system.

24. The processing system of claim 23, wherein the device is a vehicle.

25. A method of operating a processing system to transmit data via the processing system, the method comprising:

storing data to be transmitted to a memory of the processing system;

transferring the stored data via a first DMA channel from the memory to input data registers of a cryptographic co-processor, wherein the cryptographic co-processor comprises a plurality of input data registers for storing a first block of data, a plurality of output data registers for storing a first block of processed data, a first control register for storing first configuration data, a cryptographic processing circuit for processing the data stored to the input data registers as a function of the first configuration data stored to the first control register, and for storing respective processed data to the output data registers, wherein the cryptographic processing circuit generates a first control signal when the processed data have been stored to the output data registers, a first DMA interface circuit for generating a first request signal requesting that a new first block of data be transferred to the input data registers by asserting the first request signal as a function of the first configuration data stored to the first control register and in response to a synchronization signal, and de-asserting the first request signal in response to a first acknowledge signal, and a second DMA interface circuit for generating a second request signal requesting that a first block of processed data be transferred from the output data registers by asserting the second request signal as a function of the first control signal, and de-asserting the second request signal in response to a second acknowledge signal, wherein the second DMA interface circuit asserts the synchronization signal in response to the second acknowledge signal, and wherein the cryptographic co-processor generates encrypted data stored to the output data registers of the cryptographic co-processor; and transferring the encrypted data via a second DMA channel from the output data registers of the cryptographic co-processor to transmission data registers of a first communication interface, wherein the first communication interface comprises a plurality of transmission data registers for storing a second block of data, a second control register for storing second configuration data, and a hardware communication interface for transmitting the data stored to the transmission data registers as a function of the second configuration data stored to the second control register, wherein the hardware communication interface generates a second control signal when the data stored to the transmission data registers have been transmitted, and wherein the first communication interface transmits the data stored to the transmission data registers of the first communication interface.

26. A method of operating a processing system to received data via the processing system, the method comprising:

receiving data via a first communication interface having associated a storage element having a plurality of slots, wherein the first communication interface stores the received data to the slots of the storage element, wherein a cryptographic co-processor comprises a plurality of input data registers, a plurality of output data registers, a first control register, a cryptographic processing circuit for processing data stored to the input data registers as a function of first configuration data stored to the first control register, and for storing respective processed data to the output data registers, wherein the cryptographic processing circuit generates a first control signal when the processed data have been stored to the output data registers, a first DMA interface circuit for generating a first request signal requesting that a new first block of data be transferred to the input data registers by asserting the first request signal as a function of the first configuration data stored to the first control register and in response to a synchronization signal, and de-asserting the first request signal in response to a first acknowledge signal, a second DMA interface circuit for generating a second request signal requesting that a first block of processed data be transferred from the output data registers by asserting the second request signal as a function of the first control signal, and de-asserting the second request signal in response to a second acknowledge signal, wherein the second DMA interface circuit asserts the synchronization signal in response to the second acknowledge signal, wherein a first DMA channel sends requests to a memory controller to transfer a first block of data from the output data registers to a memory of the processing system in response to the second request signal, and once having transferred the first block of data from the output data registers to the memory, assert the second acknowledge signal;

transferring the received data via a second DMA channel from the storage element to input data registers of the cryptographic co-processor, wherein the cryptographic co-processor generates decrypted data stored to output data registers of the cryptographic co-processor; and transferring the encrypted data via the first DMA channel from the output data registers of the cryptographic co-processor to the memory of the processing system.

* * * * *

UNITED STATES PATENT AND TRADEMARK OFFICE
CERTIFICATE OF CORRECTION

| | | |
|---|---|---|
| PATENT NO. | : 11,762,794 B2 | Page 1 of 1 |
| APPLICATION NO. | : 17/747800 | |
| DATED | : September 19, 2023 | |
| INVENTOR(S) | : Nandlinger et al. | |

It is certified that error appears in the above-identified patent and that said Letters Patent is hereby corrected as shown below:

In the Claims

In Column 32, in Claim 19, Line 6, delete "fist" and insert -- first --.

Signed and Sealed this
Twelfth Day of December, 2023

Katherine Kelly Vidal
*Director of the United States Patent and Trademark Office*